(12) United States Patent
Fjare et al.

(10) Patent No.: US 9,944,859 B2
(45) Date of Patent: Apr. 17, 2018

(54) DEEP DEOXYGENATION OF BIOCRUDES UTILIZING FLUIDIZED CATALYTIC CRACKING CO-PROCESSING WITH HYDROCARBON FEEDSTOCKS

(71) Applicants: Phillips 66 Company, Houston, TX (US); Albemarle Corporation, Baton Rouge, LA (US)

(72) Inventors: Kristi A. Fjare, Bartlesville, OK (US); TiePan Shi, Bartlesville, OK (US); Constantino Badra, Owasso, OK (US); Terry S. Cantu, Bartlesville, OK (US); Milena Vasic, Oegstgeest (NL); Ruben van Duren, Hilversum (NL); Marty Pronk, Amstelveen (NL); Leen Gerritsen, Lunteren (NL)

(73) Assignee: Phillips 66 Company Albermarle Corporation, Houston, TX (US)

( * ) Notice: Subject to any disclaimer, the term of this patent is extended or adjusted under 35 U.S.C. 154(b) by 698 days.

(21) Appl. No.: 13/866,837

(22) Filed: Apr. 19, 2013

(65) Prior Publication Data
US 2014/0316176 A1 Oct. 23, 2014

(51) Int. Cl.
C10G 1/08 (2006.01)
C10G 3/00 (2006.01)
C10G 11/18 (2006.01)

(52) U.S. Cl.
CPC ............... C10G 3/44 (2013.01); C10G 3/49 (2013.01); C10G 3/57 (2013.01); C10G 11/18 (2013.01); Y02P 30/20 (2015.11)

(58) Field of Classification Search
USPC ............................ 585/240–242; 422/139–147
See application file for complete search history.

(56) References Cited

U.S. PATENT DOCUMENTS

| | | |
|---|---|---|
| 6,183,699 B1 | 2/2001 | Lomas |
| 7,868,214 B2 * | 1/2011 | Marker ................. C07C 4/04 208/113 |
| 8,114,272 B2 | 2/2012 | Maher |
| 8,137,534 B2 | 3/2012 | Upson et al. |
| 8,183,422 B2 | 5/2012 | Alegria et al. |
| 8,246,914 B2 | 8/2012 | Mehlberg et al. |
| 2009/0149317 A1 * | 6/2009 | Stamires ............... C10G 11/05 502/63 |
| 2011/0308996 A1 | 12/2011 | Choudhary et al. |
| 2012/0160741 A1 | 6/2012 | Gong et al. |
| 2013/0145683 A1 * | 6/2013 | Freel ..................... C10L 1/1802 44/307 |
| 2013/0276360 A1 * | 10/2013 | Boon ..................... B01J 8/32 44/307 |
| 2013/0289324 A1 * | 10/2013 | Price ..................... C10G 3/42 585/469 |
| 2014/0163285 A1 * | 6/2014 | Buchanan ............ B01J 37/0201 585/469 |

FOREIGN PATENT DOCUMENTS

WO WO 2004/096954 A1 11/2004

OTHER PUBLICATIONS

Marker et al. ("Opportunities for Biorenewables in Oil Refineries", DOE Report DE-FG36-05GO15085, published Dec. 12, 2005 (p. 1, left column, field "E."), p. 29-30).*
Soltis-Muth "TP—It Stand for Total Phosphorus", Northwest Ohio Regional Sewer District.*
Huber and Corma, "Synergies between Bio- and Oil Refineries for the Production of Fuels from Biomass", Angewandte Chemie, 2007, pp. 1-19.
DOE and UOP Report by Terry L. Marker, "Opportunities for Biorenewables in Oil Refineries Final Technical Report", dated Dec. 12, 2005, pp. 1-60.

* cited by examiner

Primary Examiner — In Suk C Bullock
Assistant Examiner — Ali Z Fadhel
(74) Attorney, Agent, or Firm — Tumey L.L.P.

(57) ABSTRACT

A system and method produce hydrocarbons from biomass by fluid catalytic cracking. In one embodiment, the system is a fluid catalytic cracking system. The system includes a riser. The riser contains a catalyst. The system also includes a biological feed comprising biomass-derived liquid for the riser. In addition, the system includes a hydrocarbon feed comprising hydrocarbons for the riser. The biological feed and the hydrocarbons react in the riser in the presence of the catalyst to convert at least a portion of the biological feed and the hydrocarbons to hydrocarbon products. The hydrocarbon products comprise a concentration of oxygen from about 0.005 wt. % to about 6 wt. %.

8 Claims, 7 Drawing Sheets

DEEP DEOXYGENATION OF BIOCRUDES UTILIZING FLUIDIZED CATALYTIC CRACKING CO-PROCESSING WITH HYDROCARBON FEEDSTOCKS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Field of the Invention

This invention relates to the field of hydrocarbon products and more specifically to processing biomass-derived feedstock with hydrocarbon feedstock to produce hydrocarbon products by fluidized catalytic cracking.

Background of the Invention

Renewable energy sources have been increasingly used in carbon based fuels to reduce emissions. A variety of such renewable energy sources have been explored. One of such renewable energy sources is biomass. Biomass includes organic sources of energy or chemicals that are renewable. Typical sources of biomass that have been used for fuel include trees and other vegetation, agricultural products and wastes, algae and other marine plants, metabolic and urban wastes.

Several conventional processes have been developed for the conversion of biomass. Such conventional processes include combustion, fermentation, gasification, and anaerobic digestion. However, there are drawbacks to such conventional processes for the conversion of biomass. For instance, bio-oil is a product of biomass. Drawbacks to the produced bio-oil include the bio-oil having high levels of oxygen. Further drawbacks include costly and inefficient upgrading of the bio-oil.

Hydroprocessing of bio-oil has been developed to overcome drawbacks to conventional processes. Hydroprocessing includes hydrotreating, hydrocracking, or combinations thereof. Hydroprocessing may remove oxygen as water. Hydroprocessing also has drawbacks. Drawbacks include that the high oxygen content of bio-oil typically makes hydroprocessing expensive in light of the large amount of hydrogen involved. Moreover, hydrogenation may be typical and of a non-selective nature. For instance, aromatic components present in the bio-oil may also be hydrogenated, which may increase hydrogen consumption beyond the levels used for oxygen removal.

Consequently, there is a need for improved processes for reducing the oxygen content of bio-oil and other liquid products of biomass.

BRIEF SUMMARY OF SOME OF THE PREFERRED EMBODIMENTS

These and other needs in the art are addressed in one embodiment by a fluid catalytic cracking system. The fluid catalytic cracking system includes a riser. The riser contains a catalyst (i.e., cracking catalyst). The fluid catalytic cracking system also includes a biological feed comprising a biomass-derived liquid for the riser. The fluid catalytic cracking system further includes a hydrocarbon feed comprising hydrocarbons for the riser. The biological feed and the hydrocarbons react in the riser in the presence of the catalyst to convert at least a portion of the biological feed and at least a portion of the hydrocarbons to hydrocarbon products. The hydrocarbon products comprise a concentration of oxygen from about 0.005 wt. % to about 6 wt. %.

These and other needs in the art are addressed in another embodiment by a method for producing hydrocarbon products. The method includes introducing a biological feed to a riser. The method also includes introducing a hydrocarbon feed comprising hydrocarbons to the riser. The riser contains a catalyst (i.e., cracking catalyst). The method further includes reacting the hydrocarbon feed and the biological feed in the presence of the catalyst to convert at least a portion of the biological feed and the hydrocarbons to hydrocarbon products. The hydrocarbon products comprise a concentration of oxygen from about 0.005 wt. % to about 6 wt. %.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
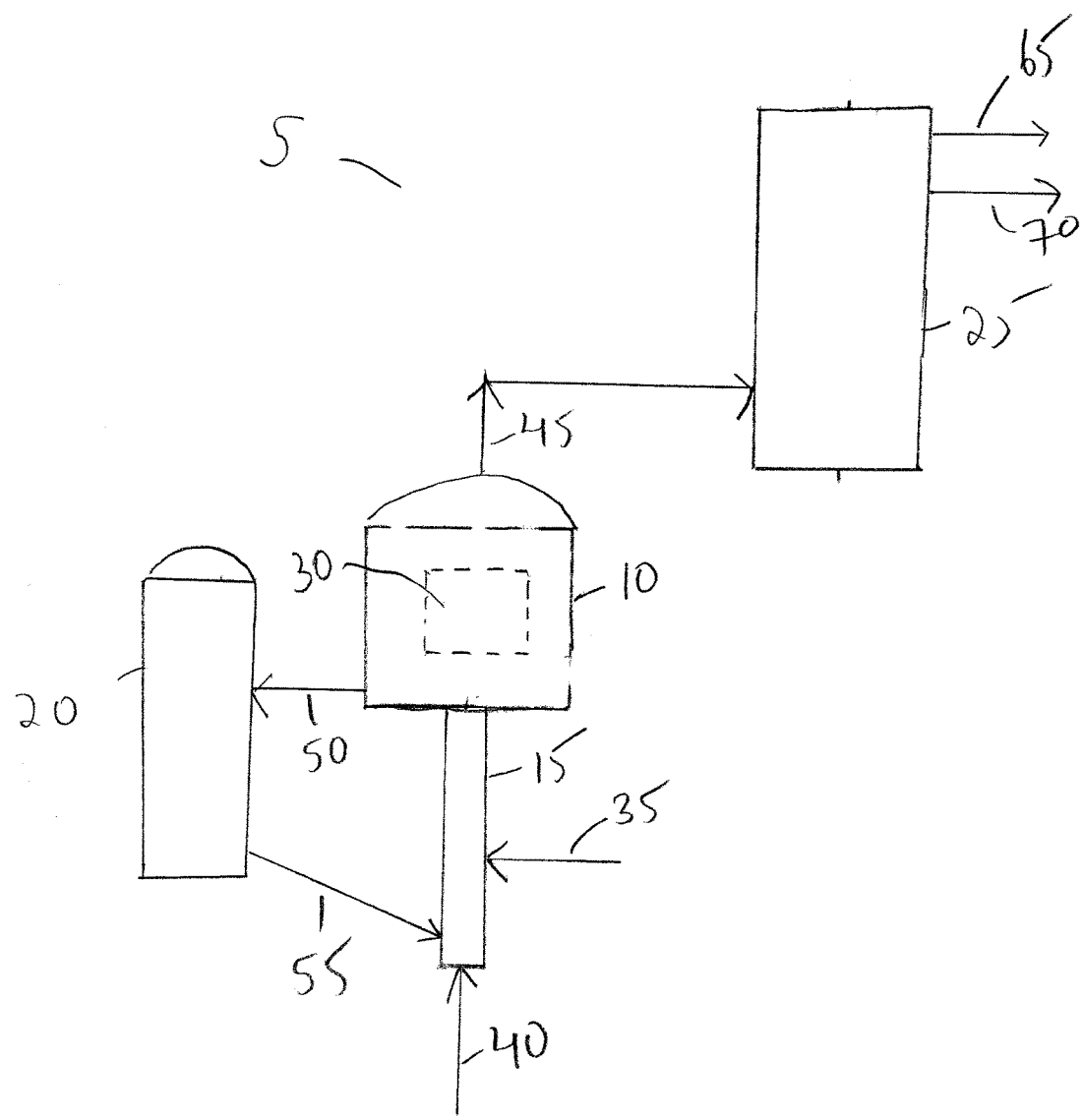
FIG. 1 illustrates an embodiment of a fluid catalytic cracking system having a reactor, a riser, a stripper, a fractionator, and a regenerator.

FIG. 1 illustrates an embodiment of fluid catalytic cracking system 5 for converting at least a portion of biological feed 35 and hydrocarbon feed 40 to hydrocarbon products 45. In embodiments, fluid catalytic cracking system 5 removes oxygen from biological feed 35 in producing hydrocarbon products 45. In embodiments, fluid catalytic cracking system 5 provides hydrocarbon products 45 with an oxygen content (i.e., concentration) from about 0.005 wt. % to about 6 wt. %, alternatively from about 0.005 wt. % to about 2 wt. %, and alternatively from about 0.005 wt. % to about 0.05 wt. %, and further alternatively from about 0.4 wt. % to about 0.11 wt. %, and alternatively from about 0.005 wt. % to about 0.2 wt. %. In embodiments, fluid catalytic cracking system 5 removes a significant part of the oxygen in the form of COx instead of as water. In embodiments, COx production ranges from about 3.5 wt % to about 21.0 wt. % yield from biological feed 35, alternatively from about 0.1 wt. % to about 3.3 wt. %, and alternatively from about 0.0 wt. % to about 3.3 wt. %. Fluid catalytic cracking system 5 also provides a surprising yield of the hydrocarbons in biological feed 35 into liquid hydrocarbons of $C_3$ or higher (e.g., in hydrocarbon products 45). In embodiments, fluid catalytic cracking system 5 has a yield of hydrocarbons in biological feed 35 and hydrocarbon feed 40 to liquid hydrocarbons of $C_3$ or higher of from about 80.0 wt. % to about 100.0 wt. %, alternatively from about 80.0 wt. % to about 99.0 wt. %, and alternatively from about 80 wt. % to about 95 wt. %. Fluid catalytic cracking system 5 has a coke production of from about 0.6 wt. % to about 4.1 wt. %, alternatively from about 2.7 wt. % to about 4.1 wt. %, and alternatively from about 3.1 wt. % to about 4.1 wt. %, and further alternatively from about 2.0 wt. % to about 3.4 wt. %, and alternatively from about 2.7 wt. % to about 3.4 wt. %, further alternatively from about 2.5 wt. % to about 7.7 wt. %. Without limitation, at a constant conversion, coke yields may increase or decrease depending on the biological feed 35 used. In embodiments, biological feeds 35 comprising acidulated vegetable oil and/or palm fatty acid distillate decreased coke production at constant conversion by about 15 wt. % to about 25 wt. % as compared to hydrocarbon feed 40 only. In an embodiment, such biological feed 35 is used as 20 wt. % of a mixture (i.e., riser feed 80) with hydrocarbon feed 40. In some embodiments, biological feed 35 comprising sugar derivatives (i.e., ethyl levulinate and/or methyl glucoside) increased coke production at constant conversion by about 15 wt. % to about 27 wt. %. In an embodiment, such biological feed 35 is used as 20 wt. % of a mixture (i.e., riser feed 80) with hydrocarbon feed 40. Without limitation, fluid catalytic cracking system 5 provides reactions that break (i.e., crack) high-boiling hydrocarbons into shorter molecules.

Biological feed 35 includes any suitable type of biomass-derived liquid that may be converted to a fuel. In embodiments, the biomass-derived liquid includes liquid derived from biomass. Biomass includes any organic source of energy or chemicals that is renewable. Without limitation, examples of biological feed 35 include animal fats, plant fats, triglycerides, biological waste, algae, pyrolysis oil (i.e., bio-oil), and the like. In an embodiment, biological feed 35 comprises pyrolysis oil.

Hydrocarbon feed 40 includes any conventional fluid catalytic cracking feed such as heavy hydrocarbon streams. In an embodiment, heavy hydrocarbon streams include high boiling fractions of crude oil, residual oils, or any combinations thereof. High boiling fractions of crude oil include atmospheric and vacuum gas oil such as light vacuum gas oil and heavy vacuum gas oil. In some embodiments, high boiling fractions of crude oil may or may not be subjected to hydrotreatment prior to introduction to riser 15. In embodiments, residual oils include crude oil atmospheric distillation column residues (e.g., that boil above 343° C.), crude oil vacuum distillation column residues (e.g., that boil above 566° C.), tars, bitumen, coal oils, shale oils, Fischer-Tropsch wax, or any combinations thereof. In some embodiments, hydrocarbon feed 40 includes between about 60 volume % and about 100 volume % of hydrocarbons boiling at greater than a representative cutoff temperature of a crude oil atmospheric column residue, alternatively between about 60 volume % and about 95 volume % of hydrocarbons boiling at greater than a representative cutoff temperature of a crude oil atmospheric column residue, and alternatively between about 90 volume % and about 100 volume % of hydrocarbons boiling at greater than a representative cutoff temperature of a crude oil atmospheric column residue, and further alternatively between about 95 volume % and about 100 volume % of hydrocarbons boiling at greater than a representative cutoff temperature of a crude oil atmospheric column residue. The representative cutoff temperature may be any suitable temperature. In an embodiment, the representative cutoff temperature is 343° C.

In embodiments as shown in FIG. 1, fluid catalytic cracking system 5 has reactor 10, riser 15 and regenerator 20. It is to be understood that fluid catalytic cracking system 5 is not limited to the configuration of the embodiments shown in FIG. 1. Fluid catalytic cracking system 5 may include any fluid catalytic cracking process that vaporizes and breaks high-boiling hydrocarbon liquids in biological feed 35 and hydrocarbon feed 40 into shorter molecules in the presence, at suitable conditions, of a fluid catalytic cracking catalyst (i.e., by contact with the catalyst). In alternative embodiments (not shown), fluid catalytic cracking system 5 has a stacked reactor, which embodiment of a reactor has reactor 10 and regenerator 20 in a single vessel with reactor 10 disposed above regenerator 20.

In embodiments as shown in FIG. 1, reactor 10 is a reaction vessel. Reactor 10 may include any configuration suitable for fluid catalytic cracking. In embodiments as shown, reactor 10 includes a disengagement device suitable for removing catalyst particles from the product hydrocarbon stream, hydrocarbon products 45. In an embodiment, reactor 10 includes a cyclone separator unit. In some ° embodiments, reactor 10 includes more than one cyclone separator unit. In an embodiment, reactor 10 includes stripper 30. In embodiments, stripper 30 is a vessel in which residual hydrocarbon products 45 are removed from the spent catalyst 50.

Figure 2:
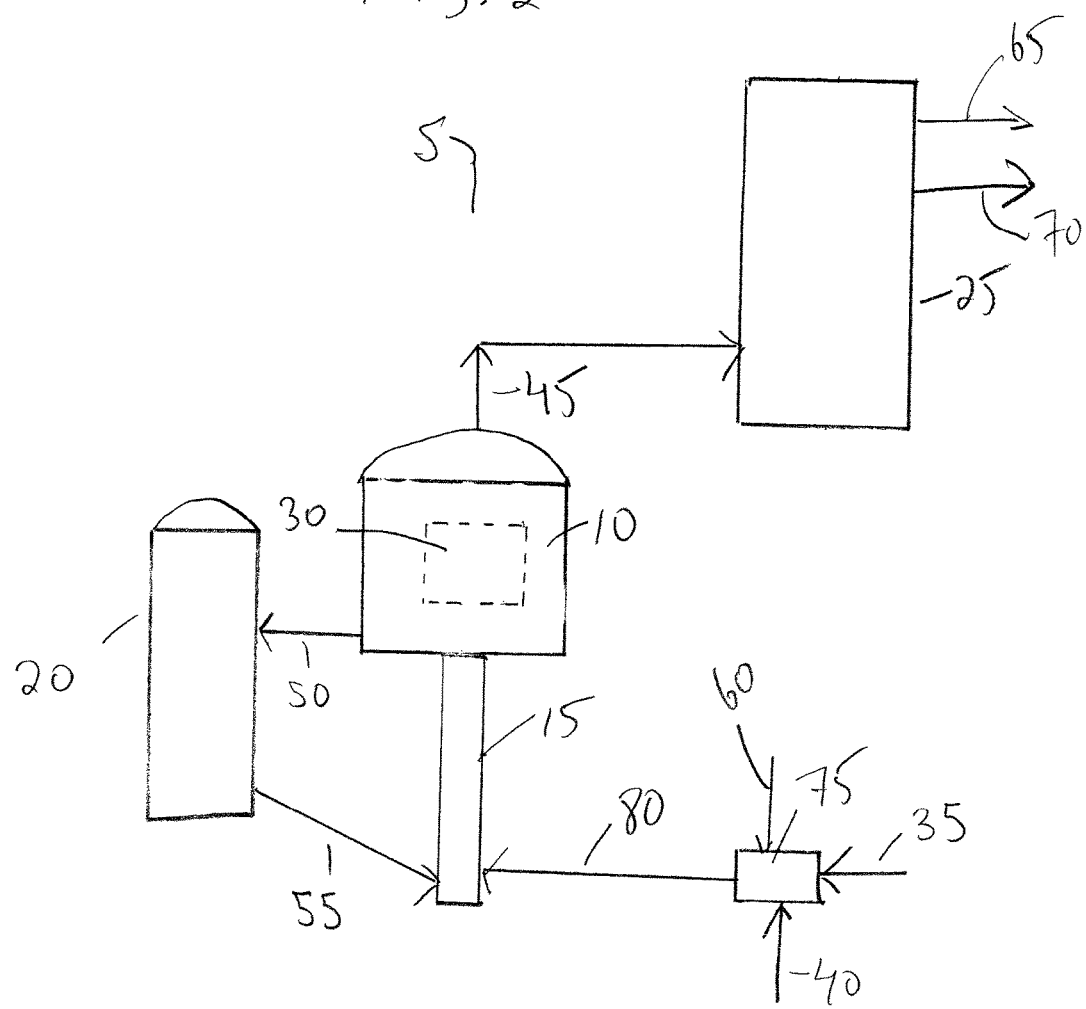
FIG. 2 illustrates an embodiment of a fluid catalytic cracking system having a reactor, a riser, a fractionator, a stripper, a mixer, and a regenerator.

As shown in FIG. 1, embodiments of fluid catalytic cracking system 5 include riser 15. In embodiments, a portion or a majority of the cracking reactions occur in riser 15. In embodiments, the catalyst is disposed in riser 15. In embodiments, vaporized biological feed 35 and hydrocarbon feed 40 are introduced to riser 15 to facilitate fluidization of the catalyst. It is to be understood that alternative embodiments include fluidizing the catalyst by any suitable means. In some embodiments (not shown), fluid catalytic cracking system 5 has more than one riser 15. Fluid catalytic cracking system 5 may have any residence time in riser 15 suitable for catalytic cracking. Embodiments include a residence time from about 0.1 second to about 5 seconds, alternatively from about 0.1 seconds to about 3 seconds, and alternatively from about 0.1 seconds to about 2 seconds, and further alternatively from about 0.1 seconds to about 1.5 seconds, and alternatively from about 0.1 seconds to about 1 second, and alternatively from about 0.1 seconds to about 0.5 seconds. In embodiments, riser 15 may have any individual residence time within the ranges disclosed above. Any suitable feed combination may also be provided to riser 15. In embodiments as shown in FIG. 1, biological feed 35 and hydrocarbon feed 40 are fed separately to riser 15, with hydrocarbon feed 40 fed to a bottom portion of riser 15 and biological feed 35 fed to a side of riser 15. Biological feed 35 may be fed at any suitable location on riser 15, which may include the hydrocarbon feed 40 injection point. In embodiments, biological feed 35 is fed proximate to hydrocarbon feed 40. In some embodiments (not illustrated), biological feed 35 and/or hydrocarbon feed 40 may be fed at multiple feed points to riser 15. In an embodiment as shown in FIG. 2, biological feed 35 and hydrocarbon feed 40 are fed to mixer 75. Mixer 75 may be any suitable mixer for mixing biological feed 35 and hydrocarbon feed 40. In embodiments, mixer 75 provides sonication to biological feed 35 and hydrocarbon feed 40 for agitation. Mixer 75 mixes biological feed 35 and hydrocarbon feed 40 to produce riser feed 80, which comprises biological feed 35 and hydrocarbon feed 40. Without limitation, mixer 75 agitates biological feed 35 and hydrocarbon feed 40 to disperse biological feed 35.

In embodiments as shown in FIG. 2, riser feed 80 has from about 0.1 wt. % biological feed 35 to about 99.9 wt. % biological feed 35 and from about 99.9 wt. % hydrocarbon feed 40 to about 0.1 wt. % hydrocarbon feed 40, alternatively from about 1 wt. % biological feed 35 to about 99 wt. % biological feed 35 and from about 99 wt. % hydrocarbon feed 40 to about 1 wt. % hydrocarbon feed 40, alternatively from about 5 wt. % biological feed 35 to about 95 wt. % biological feed 35 and from about 95 wt. % hydrocarbon feed 40 to about 5 wt. % hydrocarbon feed 40, and alternatively from about 20 wt. % biological feed 35 to about 80 wt. % biological feed 35 and from about 80 wt. % hydrocarbon feed 40 to about 20 wt. % hydrocarbon feed 40, and further alternatively from about 30 wt. % biological feed 35 to about 70 wt. % biological feed 35 and from about 70 wt. % hydrocarbon feed 40 to about 30 wt. % hydrocarbon feed 40, and alternatively from about 40 wt. % biological feed 35 to about 60 wt. % biological feed 35 and from about 60 wt. % hydrocarbon feed 40 to about 40 wt. % hydrocarbon feed 40. In embodiments, riser feed 80 may include any intermediate amounts of the ranges above of biological feed 35 and hydrocarbon feed 40. In the embodiment of FIG. 1, fluid catalytic cracking system 5 includes biological feed 35 and hydrocarbon feed 40 introduced to riser 15 with the same ratios of ranges as disclosed for the embodiment of FIG. 2.

In some embodiments, fluid catalytic cracking system 5 includes hydrotreating hydrocarbon feed 40 prior to introducing hydrocarbon feed 40 to riser 15 or to mixer 75. Hydrocarbon feed 40 may be hydrotreated by any suitable method.

In some embodiments as shown in FIG. 2, an emulsifier 60 may be added. Without limitation, emulsifier 60 facilitates maintaining an emulsion. Emulsifier 60 may include any suitable emulsifier. In embodiments, emulsifier 60 includes polyalkylene oxide block copolymers, non-ionic block copolymers, ethoxylated alkyl phenols, ethylene oxide propylene oxide block copolymers, polymerized alcohols and amines, partially fluorinated chain hydrocarbons, or any combinations thereof. Commercial examples of emulsifier 60 include ATLOX® 4912 and ATLOX® 4914. ATLOX® is a registered trademark of Uniqema Americas LLC. Any suitable amount of emulsifier 60 may be added. In embodiments, emulsifier 60 is added in an amount to provide a riser feed 80 having from about 0.1 wt. % emulsifier 60 to about 8 wt. % emulsifier 60, alternatively from about 1 wt. % emulsifier 60 to about 5 wt. % emulsifier 60, and alternatively from about 0.1 wt. % emulsifier 60 to about 2.0 wt. % emulsifier, alternatively from about 0.5 wt. % emulsifier 60 to about 1.5 wt. % emulsifier 60. In some embodiments (not illustrated), emulsifier 60 is introduced to riser 15 in the amounts disclosed above.

Reactor 10 and/or riser 15 may be operated at any suitable temperatures and pressures to provide the desired cracking. In embodiments, the temperatures are from about 480° C. to about 630° C., alternatively from about 500° C. to about 630° C., alternatively from about 510° C. to about 600° C., and alternatively from about 510° C. to about 600° C., and further alternatively from about 500° C. to about 550° C. Embodiments include pressures from about 100 kPa to about 450 kPa, alternatively from about 110 kPa to about 450 kPa, and alternatively from about 110 kPa to about 310 kPa.

The catalyst may include any catalyst or mixture of catalysts suitable for catalytic cracking whether alone or in combination with catalytic cracking additives. Any suitable catalytic cracking additive may be used as, without limitation, ZSM-5 additives, gasoline sulfur reduction additives, SOx reduction additives, or any combinations thereof. In an embodiment, the catalyst is a catalyst mixture of a first catalyst and a second catalyst. In embodiments, the first catalyst includes any catalyst suitable for catalytic cracking such as, without limitation, an active amorphous clay-type catalyst, crystalline molecular sieves, or any combinations thereof. In an embodiment, the crystalline molecular sieve includes zeolites. In embodiments, the zeolites include X zeolites, Y zeolites, mordenite, faujasite, BETA zeolite, or any combinations thereof. The crystalline molecular sieve may have any suitable pore size. In some embodiments, the crystalline molecular sieve is a large pore zeolite with an effective pore diameter from about 0.2 nm to about 0.8 nm, alternatively from about 0.5 nm to about 0.8 nm, and alternatively from about 0.7 nm to about 0.74 nm and defined by about 10 to about 12 membered rings. Pore size indices are from about 0.6 to about 38.

In embodiments, the second catalyst includes any catalyst suitable for catalytic cracking such as zeolites. In embodiments, the zeolites include ZSM-5, ZSM-11, ZSM-12, ZSM-23, ZSM-35, ZSM-38, ZSM-48, ferrierite, erionite, or any combinations thereof. In an embodiment, the zeolites are dispersed on a matrix. The crystalline molecular sieve may have any suitable pore size. In some embodiments, the zeolites are small or medium pore zeolites with an effective pore diameter from about 0.2 nm to about 0.7 nm, alternatively from about 0.5 nm to about 0.7 nm and defined by about 10 or less rings. Pore size indices are from about 0.6 to about 30.

In embodiments, the first and/or second catalysts also include active alumina material, binder material, amorphous silica-alumina, phosphates, metal traps, inert filler, or any combinations thereof. Any suitable binder material may be used such as silica, alumina, or any combinations thereof. Any suitable inert filler may be used such as kaolin.

In embodiments, the catalysts comprise the following compositions: kaolin from about 10 wt. % to about 60 wt. %, aluminum oxide from about 20 wt. % to about 65 wt. %, zeolites from about 5 wt. % to about 60 wt. %, and silicon dioxide from about 2 wt. % to about 30 wt. %; kaolin from about 10 wt. % to about 90 wt. %, zeolites from about 5 wt. % to about 40 wt. %, and aluminum orthophosphate from about 0.1 wt. % to about 30 wt. % or alternatively aluminum orthophosphate from about 0 wt. % to about 30 wt. %; aluminum oxide from about 0.1 wt. % to about 60 wt. % or alternatively aluminum oxide from about 0 wt. % to about 60 wt. %, silicon dioxide from about 0.1 wt. % to about 10 wt. % or alternatively silicon dioxide from about 0 wt. % to about 10 wt. %, magnesium oxide from about 0.1 wt. % to about 60 wt. % or alternatively magnesium oxide from about 0 wt. % to about 60 wt. %, and zinc sulfate from about 0.1 wt. % to about 15 wt. % or alternatively zinc sulfate from about 0 wt. % to about 15 wt. %; aluminum oxide from about 10 wt. % to about 40 wt. %, magnesium oxide from about 0.1 wt. % to about 60 wt. % or alternatively magnesium oxide from about 0 wt. % to about 60 wt. %, and vanadyl sulfate from about 0.1 wt. % to about 10 wt. % or alternatively vanadyl sulfate from about 0 wt. % to about 10 wt. %; aluminum oxide from about 0.1 wt. % to about 40 wt. % or alternatively aluminum oxide from about 0 wt. % to about 40 wt. %, silicon dioxide from about 0.1 wt. % to about 25 wt. % or alternatively silicon dioxide from about 0 wt. % to about 25 wt. %, and magnesium oxide from about 0.1 wt. % to about 40 wt. % or alternatively magnesium oxide from about 0 wt. % to about 40 wt. %; or any combinations thereof. In an embodiment, the catalyst comprises a first catalyst and a second catalyst with the first catalyst comprising kaolin from about 10 wt. % to about 50 wt. %, aluminum oxide from about 20 wt. % to about 65 wt. %, zeolites from about 5 wt. % to about 60 wt. %, and silicon dioxide from about 2 wt % to about 30 wt. %, and the second catalyst comprising aluminum oxide from about 10 wt. % to about 40 wt. %, magnesium oxide from about 0 wt. % to about 60 wt. %, and vanadyl sulfate from about 0 wt. % to about 10 wt. %.

The catalyst may have any suitable mixture of first and second catalysts. In embodiments, the catalyst has from about 1 wt. % to about 30 wt. % second catalyst and from about 99 wt. % to about 70 wt. % first catalyst, alternatively from about 10 wt. % to about 25 wt. % second catalyst and from about 90 wt. % to about 75 wt. % first catalyst, and alternatively from about 15 wt. % to about 20 wt. % second catalyst to about 85 wt. % to about 80 wt. % first catalyst. In embodiments, the catalyst has any intermittent ranges or wt. % of first catalyst and second catalyst within the ranges above.

In embodiments as shown in FIGS. 1 and 2, after catalyst enters stripper 30, the separated spent catalyst 50 flows to regenerator 20. Regenerator 20 operates at any suitable conditions to remove (i.e., burn) a portion or all of the coke accumulated on the spent catalyst 50 (i.e., regenerate the catalyst). In an embodiment, regenerator 20 operates at temperatures from about 590° C. to about 860° C., alternatively from about 590° C. to about 760° C., and alternatively from about 650° C. to about 860° C., and further alternatively from about 650° C. to about 760° C. After such regeneration, regenerated catalyst 55 is returned to riser 15.

In embodiments of operation of fluid catalytic cracking system 5 as shown in FIG. 1, biological feed 35 and hydrocarbon feed 40 are introduced to riser 15. In some embodiments (not illustrated), emulsifier 60 is also introduced to riser 15. In embodiments of operation of fluid catalytic cracking system 5 as shown in FIG. 2, biological feed 35 and hydrocarbon feed 40 are introduced to mixer 75. In some embodiments as shown, emulsifier 60 is also introduced to mixer 75. Mixer 75 mixes such components to provide riser feed 80. The catalyst disposed in riser 15 is fluidized, and the catalyst, biological feed 35, and hydrocarbon feed 40 (and in some embodiments emulsifier 60) flow upward through riser 15, with biological feed 35 and hydrocarbon feed 40 contacting the catalyst with the desired cracking reactions being carried out to produce hydrocarbon products 45. The catalyst, biological feed 35, products (i.e., hydrocarbon products 45), and hydrocarbon feed 40 proceed into reactor 10 in which, in some embodiments, cracking reactions continue to occur. Stripper 30 separates the catalyst from hydrocarbon products 45. The separated catalyst is introduced to regenerator 20 as spent catalyst 50, with coke produced from the reaction deposited on such spent catalyst 50. In regenerator 20, a portion or all of the coke is removed from spent catalyst 50 to produce regenerated catalyst 55, which is re-introduced to riser 15. Hydrocarbon products 45 exit reactor 10. In some embodiments as shown in FIGS. 1 and 2, hydrocarbon products 45 are introduced to fractionator 25. Hydrocarbon products 45 include gasoline, ethylene, propylene, butylene, and the like. Fractionator 25 may include any equipment and processes suitable for separating hydrocarbon products 45 into different fractions. In embodiments, fractionator 25 is a distillation column. For instance, in an embodiment, fractionator 25 separates hydrocarbon products into light products 65 (i.e., a stream comprising ethylene and/or propylene) and products 70 (i.e., a stream comprising gasoline).

In some embodiments in which hydrocarbon products 45 comprise water, hydrocarbon products 45 are treated to remove a portion or substantially all of the water in hydrocarbon products 45. The water may be removed by any suitable method.

To further illustrate various illustrative embodiments of the present invention, the following examples are provided.

Example 1

The catalyst was deactivated using steam deactivation for 20 hours at 788° C. with 100 mol % steam. The catalyst was composed of kaolin, aluminum oxide, zeolites, and silicon dioxide. Performance testing took place using the Short Contact Time Resid Test Unit, a commercially available fluidized bed test unit described in available literature (Baas et al., Proc NAM 2008, Houston, of North Am. Cat. Soc.). 20 wt. % of pyrolysis oil (49.7 oxygen wt. %) was blended with a typical oxygen-free fossil fluid catalytic cracking feed (86.0 wt. % carbon, 13.8 wt. % hydrogen, and 0.2 wt. % nitrogen) and stirred at 75° C. in a closed vessel before injecting into the unit (3 ml of feed). Tests were performed at 600° C. with a contact time of 1 second. Liquid product was collected in a receiver at −6° C. and analyzed. Subsequent analyses were performed using standard equipment, all calibrated as subscribed. Table I below shows the product yield distribution as a weight percent of the total feed and oxygen amount determined in water-free product fraction obtained with the catalyst at a catalyst to oil ratio (CTO) of 5.5 wt/wt.

TABLE I

| | |
|---|---|
| Conversion (wt. %) | 68.9 |
| Water | 9.0 |
| COx | 1.5 |
| Dry gas | 0.7 |
| LPG | 11.5 |
| Gasoline | 43.5 |
| LCO | 23.1 |
| Bottoms | 8.0 |
| Coke | 2.7 |
| Oxygen (wt. %) | 0.09 |

Example 2

The catalyst had 80 wt. % of a first catalyst and 20 wt. % of a second catalyst. The first catalyst was composed of kaolin, aluminum oxide, zeolites, and silicon dioxide, and the second catalyst was composed of aluminum oxide, silicon dioxide, magnesium oxide, and zinc sulfate. The combined catalysts were deactivated using steam deactivation for 20 hours at 788° C. with 100 mol % steam. Performance testing took place using the Short Contact Time Resid Test Unit (Baas et al., Proc NAM 2008, Houston, of North Am. Cat. Soc.). 20 wt. % of pyrolysis oil (49.7 oxygen wt. %) was blended with a typical oxygen-free fossil fluid catalytic cracking feed (86.0 wt. % carbon, 13.8 wt. % hydrogen, and 0.2 wt. % nitrogen) and stirred at 75° C. in a closed vessel before injecting into the unit (3 ml of feed). Tests were performed at 600° C. with a contact time of 1 second. Liquid product was collected in a receiver at −6° C. and analyzed. Subsequent analyses were performed using standard equipment, all calibrated as subscribed. Table II below shows the product yield distribution as a weight percent of the total feed and oxygen amount determined in water-free product fraction obtained with the catalyst at a CTO of 5.5 wt/wt.

TABLE II

| | |
|---|---|
| Conversion wt. % | 62.3 |
| Water | 8.6 |
| COx | 2.5 |
| Dry gas | 0.5 |
| LPG | 8.3 |
| Gasoline | 39.1 |
| LCO | 26.3 |
| Bottoms | 11.5 |
| Coke | 3.2 |
| Oxygen (wt. %) | <0.08 |

Example 3

The catalyst had 80 wt. % of a first catalyst and 20 wt. % of a second catalyst. The first catalyst was composed of kaolin, aluminum oxide, zeolites, and silicon dioxide, and the second catalyst was composed of aluminum oxide, magnesium oxide, and vanadyl sulfate. The combined catalysts were deactivated using steam deactivation for 20 hours at 788° C. with 100 mol % steam. Performance testing took place using the Short Contact Time Resid Test Unit (Baas et al., Proc NAM 2008, Houston, of North Am. Cat. Soc.). 20 wt. % of pyrolysis oil (49.7 oxygen wt. %) was blended with a typical oxygen-free fossil fluid catalytic cracking feed (86.0 wt. % carbon, 13.8 wt. % hydrogen, and 0.2 wt. % nitrogen) and stirred at 75° C. in a closed vessel before injecting into the unit (3 ml of feed). Tests were performed at 600° C. with a contact time of 1 second. Liquid product was collected in a receiver at −6° C. and analyzed. Subsequent analyses were performed using standard equipment, all calibrated as subscribed. Table III below shows the product yield distribution as a weight percent of the total feed and oxygen amount determined in water-free product fraction obtained with the catalyst at a CTO of 5.5 wt/wt.

TABLE III

| | |
|---|---|
| Conversion wt. % | 64.4 |
| Water | 8.1 |
| COx | 2.7 |
| Dry gas | 0.6 |
| LPG | 9.45 |
| Gasoline | 39.6 |
| LCO | 25.0 |
| Bottoms | 10.6 |
| Coke | 3.9 |
| Oxygen (wt. %) | <0.06 |

Example 4

The catalyst had 80 wt. % of a first catalyst and 20 wt. % of a second catalyst. The first catalyst was composed of kaolin, aluminum oxide, zeolites, and silicon dioxide, and the second catalyst was composed of aluminum oxide, silicon dioxide, and magnesium oxide. The combined catalysts were deactivated using steam deactivation for 20 hours at 788° C. with 100 mol % steam. Performance testing took place using the Short Contact Time Resid Test Unit (Baas et al., Proc NAM 2008, Houston, of North Am. Cat. Soc.). 20 wt. % of pyrolysis oil (49.7 oxygen wt. %) was blended with a typical oxygen-free fossil fluid catalytic cracking feed (86.0 wt. % carbon, 13.8 wt. % hydrogen, and 0.2 wt. % nitrogen) and stirred at 75° C. in a closed vessel before injecting into the unit (3 ml of feed). Tests were performed at 600° C. with a contact time of 1 second. Liquid product was collected in a receiver at −6° C. and analyzed. Subsequent analyses were performed using standard equipment, all calibrated as subscribed. Table IV below shows the product yield distribution as a weight percent of the total feed and oxygen amount determined in water-free product fraction obtained with the catalyst at a CTO of 8.5 wt/wt.

TABLE IV

| | |
|---|---|
| Conversion wt. % | 69 |
| Water | 8.5 |
| COx | 2.1 |
| Dry gas | 0.7 |
| LPG | 12.5 |
| Gasoline | 40.2 |
| LCO | 21.2 |
| Bottoms | 10.2 |
| Coke | 4.1 |
| Oxygen (wt. %) | <0.045 |

Example 5

The catalyst was composed of kaolin, aluminum oxide, zeolites, and silicon dioxide. The catalyst was deactivated using steam deactivation for 20 hours at 788° C. with 100 mol % steam. Performance testing took place using the Short Contact Time Resid Test Unit (Baas et al., Proc NAM 2008, Houston, of North Am. Cat. Soc.). 20 wt. % of lignin-rich fraction of pyrolysis oil (35.1 oxygen wt. %) was blended with a typical oxygen-free fossil fluid catalytic cracking feed (86.0 wt. % carbon, 13.8 wt. % hydrogen, and 0.2 wt. % nitrogen) and stirred at 75° C. in a closed vessel before injecting into the unit (3 ml of feed). Tests were performed at 600° C. with a contact time of 1 second. Liquid product was collected in a receiver at −6° C. and analyzed. Subsequent analyses were performed using standard equipment, all calibrated as subscribed. Table V below shows the product yield distribution as a weight percent of the total feed and oxygen amount determined in water-free product fraction obtained with the catalyst at a CTO of 5.5 wt/wt.

TABLE V

| | |
|---|---|
| Conversion wt. % | 69 |
| Water | 5.0 |
| COx | 0.9 |
| Dry gas | 0.7 |
| LPG | 12.3 |
| Gasoline | 46.5 |
| LCO | 23.4 |
| Bottoms | 7.5 |

TABLE V-continued

| | |
|---|---|
| Coke | 3.4 |
| Oxygen (wt. %) | 0.16 |

Example 6

The catalyst was composed of kaolin, aluminum oxide, zeolites, and silicon dioxide. The catalyst was deactivated using steam deactivation for 20 hours at 788° C. with 100 mol % steam. Performance testing took place using the Short Contact Time Resid Test Unit (Baas et al., Proc NAM 2008, Houston, of North Am. Cat. Soc.). 20 wt. % of oxygen-rich pyrolysis oil (54.6 oxygen wt. %) was blended with a typical oxygen-free fossil fluid catalytic cracking feed (86.0 wt. % carbon, 13.8 wt. % hydrogen, and 0.2 wt. % nitrogen) and stirred at 75° C. in a closed vessel before injecting into the unit (3 ml of feed). Tests were performed at 600° C. with a contact time of 1 second. Liquid product was collected in a receiver at −6° C. and analyzed. Subsequent analyses were performed using standard equipment, all calibrated as subscribed. Table VI below shows the product yield distribution as a weight percent of the total feed and oxygen amount determined in water-free product fraction obtained with the catalyst at a CTO of 10.0 wt/wt.

TABLE VI

| | |
|---|---|
| Conversion wt. % | 83 |
| Water | 13.2 |
| COx | 0.3 |
| Dry gas | 0.8 |
| LPG | 19.8 |
| Gasoline | 46.5 |
| LCO | 13.4 |
| Bottoms | 3.6 |
| Coke | 2.0 |
| Oxygen (wt. %) | 0.017 |

Example 7

Introduction

This Example estimated the ability of the FCC to process bio-derived materials. The candidate material used in this Example was pyrolysis oil ("py oil").

Summary

A FCC-reactivity study of bio-materials included py oil. Blends of vacuum gas oil (VGO) and the bio-materials (py oil) were prepared for lab cracking testing in an Advanced Catalyst Evaluation Unit (ACE Model R+), based in ACE TECHNOLOGY®, which is a registered trademark of Kayser Technology, Inc.

Laboratory testing of the VGO/pyrolysis oil blend was completed. The VGO/pyrolysis oil blend run results indicated that the pyrolysis oil appeared to catalytically-crack to useful products (such as gasoline, LCO, and LPG) when tested under typical lab reactor conditions.

Experimental

A. Feed and Catalyst

The hydrocarbon feed used both as the "base" feed and as the blending component for the bio-materials runs was vacuum gas oil. The FCC catalyst used in this example was an equilibrium catalyst (ECAT).

The FCC reactor runs were VGO-only ("base case") and 80% VGO/20% py oil (with emulsifier). In all cases, the emulsifier used was ATLOX® 4912.

B. Cracking Reaction/Conditions

All cracking runs were carried out on the ACE FCC reactor. Each blend was subjected to the following four-run sequence.

TABLE VII

| Reactor Temperature (° F.) | Catalyst/Oil Ratio |
|---|---|
| 995 | 4.8 |
| 995 | 6.0 |
| 995 | 7.5 |
| 995 | 9.0 |

C. Data Adjustments

Due to the nature of the bio-materials, some adjustments were made to the ACE data in order to take into account the effects of some non-standard molecules produced during the reactions. Thus, the product yield and conversion data generated automatically by the ACE equipment were adjusted as described below.

The bio-materials contained considerable amounts of oxygen (see Table VIII). Therefore, the catalytic cracking of these materials generated some CO, $CO_2$, and $H_2O$. Moreover, the bio-materials themselves contain some water-of-processing. On the other hand, the ACE was set up to run only hydrocarbon feeds, and the product analysis methods were not designed to capture and measure species such as CO, $CO_2$, and $H_2O$. Therefore, the CO and $CO_2$ were measured by taking gas samples of the gaseous products evolving from the liquid knockout container in the ACE unit, and having the samples analyzed by an external GC. The results were used to adjust the gas analysis produced by the gas GC of the ACE apparatus.

The $H_2O$ content was handled by knowledge of the water content of the bio-material component and by an assumption regarding water-of-reaction. The presence of the emulsifier (1 wt. % ATLOX®) was not taken into account as there was no accurate way to adjust for the reaction products of that material.

Results and Discussion

Table IX contains summary data of the corrected product yields for the VGO-base case run and the VGO/py oil run. The data collected from the ACE unit was analyzed and converted to Constant Conversion, at Constant Cat/Oil Ratio, and at Constant Coke.

In Table IX, it was noted that the liquid yields for the VGO/py oil blend were lower than the corresponding yields for the VGO-only run, which occurred because the water content was normalized over the liquid yields (only). Such normalization was carried out because the water in the reactor effluent was trapped in the ACE liquid receiver, and was thus captured as "liquid product weight", although the ACE's liquid-analysis GC did not report sample water content. Similarly, the gas/LPG yields were lower for the VGO/py oil blend than for the VGO-only, since the CO and $CO_2$ were normalized over the gas yields (only).

Note that in addition to the aforementioned adjustments for CO, $CO_2$, and $H_2O$, the mass balances for the ACE runs averaged only 97%. Thus, 3% of the mass of products from the runs were unaccounted.

The VGO/py oil yields were adjusted to a water-free basis by dividing the water-included numbers by 0.92 (for liquid yields) and 0.94 (for gas yields). Although water-free basis numbers are not shown in the table, the yields on that basis were close to those of the VGO-only case. For example, for the Constant Coke case, the water-free gasoline yield was 48.5 wt. %, the LCO yield was 17.3 wt. %, and the slurry yield was 9.9 wt. %: numbers comparable to those of the VGO feed.

Tables X, XI, and XII contain more-detailed data than in Table IX, for the Constant Conversion, Constant Coke, and Constant Cat/Oil ratio cases, respectively. Some of the data in the lower part of these tables was water-adjusted, as that was how the data was calculated by the ACE data-processing procedure. In Table X, the calculated cat/oil ratio and the associated coke-to-cat/oil ratio were not within a normal range and thus were considered to be suspect. Nevertheless, the observations derived from the data in Tables X-XII were consistent with those derived from Table IX as described above.

TABLE VIII

Feed Component Properties

| Description | VGO-Only Feed | Py Oil Feed |
|---|---|---|
| API Gravity | 22.8 | n/a |
| Specific Gravity 60/60° F. | | n/a |
| Sulfur, wt. % | 0.118 | n/a |
| Total Nitrogen, ppmw | 2600 | n/d |
| Basic Nitrogen, ppmw | 720 | n/d |
| Water, wt. % | n/a | 22.4 |
| Bromine Number | | n/a |
| Refractive Index @ 20° C. | 1.4964 | n/a |
| Con Carbon Res, wt. % | 0.1 | n/a |
| Aromaticity by $C^{13}$ NRM, % | 21.6 | 20 (est.) |
| C—H—N | | |
| Carbon, wt. % | 87.0 | 55.2 |
| Hydrogen, wt. % | 12.0 | 6.7 |
| Nitrogen, wt. % | — | 0.0 |
| Oxygen, wt. % (dry basis) | — | 38.1 |
| Metals, ppmw | | |
| Ni | 0.10 | n/a |
| V | 0.4 | n/a |
| Fe | 1.20 | n/a |
| Cu | 0.1 | n/a |
| Na + K | 1.5 | n/a |
| Viscosity @ 100° C., cSt | 5.9 | n/a |
| Boiling Range D2887/SimDist, ° F.: | | |
| (wt. %) | | |
| IBP | 391 | |
| 5 | 584 | |
| 10 | 648 | |
| 20 | 720 | |
| 30 | 772 | |
| 40 | 810 | |
| 50 | 848 | |
| 60 | 890 | |
| 70 | 938 | |
| 80 | 998 | |
| 90 | 1095 | |
| 95 | 1189 | |
| FBP | 1328 | |

TABLE IX

Summary Product Yield Data for Lab Cracking Runs

| Feed (wt. %) | Constant Conversion 100% VGO | Constant Conversion 80% VGO 20% Py Oil | Constant Coke 100% VGO | Constant Coke 80% VGO 20% Py Oil | Constant Cat/Oil 100% VGO | Constant Cat/Oil 80% VGO 20% Py Oil |
|---|---|---|---|---|---|---|
| Rxn Temp (° F.) | 995 | 995 | 995 | 995 | 995 | 995 |
| Conv., wt. % | 69.1 | 69.1 | 72.8 | 71.7 | 72.8 | 73.2 |
| C/O, wt/wt | 4.8 | 2.5 | 7.8 | 5.1 | 7.7 | 7.8 |
| Yields: | | | | | | |
| Coke | 3.5 | 4.0 | 4.7 | 4.7 | 4.7 | 5.4 |
| Hydrogen | 0.3 | 0.1 | 0.2 | 0.1 | 0.2 | 0.1 |
| CO | 0.0 | 0.6 | 0.0 | 0.6 | 0.0 | 0.6 |
| $CO_2$ | 0.0 | 0.6 | 0.0 | 0.6 | 0.0 | 0.6 |
| Dry Gas (C1 + C2) | 2.2 | 2.3 | 2.4 | 2.4 | 2.4 | 2.5 |
| Ethylene | 0.6 | 0.7 | 0.7 | 0.7 | 0.7 | 0.8 |
| Propane | 1.2 | 1.0 | 1.3 | 1.2 | 1.3 | 1.3 |
| Propylene | 4.3 | 4.1 | 4.7 | 4.3 | 4.7 | 4.5 |
| n-Butane | 1.0 | 0.8 | 1.1 | 1.0 | 1.1 | 1.0 |
| Isobutane | 3.5 | 3.1 | 4.2 | 3.6 | 4.2 | 4.0 |
| C4 Olefins | 5.1 | 5.1 | 5.1 | 4.6 | 5.1 | 4.7 |
| Gasoline (C5-430° F.) | 48.9 | 44.1 | 49.5 | 45.1 | 49.5 | 44.7 |
| LCO (430-650° F.) | 19.0 | 17.2 | 17.2 | 16.1 | 17.2 | 15.4 |
| HCO (650° F.+) | 11.2 | 10.5 | 9.4 | 9.2 | 9.4 | 8.5 |
| Water | 0.0 | 6.5 | 0.0 | 6.5 | 0.0 | 6.5 |

Mass balances were adjusted for CO, $CO_2$, and water using some assumptions: gas analysis data was not available for all runs, thus $CO/CO_2$ ratios were assumed equal for all bio-material runs; gas adjustment ratios were calculated from one run per feed but applied to all bio-material feed cases; liquid adjustment ratios for water were calculated from one run per feed and applied to all bio-material feed cases; bio-materials were assumed to produce water-of-reaction @ 10 relative wt. %; due to inadequacy of assumptions, any final closure of mass balances was achieved by normalizing data. Conversions were not adjusted for water. Extrapolation was used for the C/O, wt/wt of 2.5 because the number was outside of the ACE data.

TABLE X

Detailed Product Yield Data at Constant Conversion
ACE Yield Comparisons at Constant Conversion

| Feed (wt. %) | 100% VGO | 80% VGO 20% Py Oil |
|---|---|---|
| Rxn Temp (° F.) | 995 | 995 |
| 430° F.+ Conv., wt. % | 69.1 | 69.1 |
| C/O, wt/wt | 4.8 | 2.5 |
| Yields, wt. % | | |
| Coke | 3.5 | 4.0 |
| Hydrogen | 0.3 | 0.1 |
| CO | 0.0 | 0.6 |
| $CO_2$ | 0.0 | 0.6 |
| Dry Gas (C1 + C2) | 2.2 | 2.3 |
| Methane | 1.0 | 1.0 |
| Ethane | 0.6 | 0.7 |
| Ethylene | 0.6 | 0.7 |
| Propane | 1.2 | 1.0 |
| Propylene | 4.3 | 4.1 |
| n-Butane | 1.0 | 0.8 |
| Isobutane | 3.5 | 3.1 |
| $C_4$ Olefins | 5.1 | 5.1 |
| 1-butene | 1.2 | 1.1 |
| Isobutylene | 1.2 | 1.1 |
| c-2-butene | 1.2 | 1.1 |
| t-2-butene | 1.5 | 1.5 |
| Butadiene | 0.1 | 0.1 |
| Gasoline (C5-430° F.) | 48.9 | 44.1 |
| LCO (430° F.-650° F.) | 19.0 | 17.2 |
| Slurry (650° F.+) | 11.2 | 10.5 |
| Water ** | 0.0 | 6.5 |
| Miscellaneous Yields and Selectivities: | 69.9 | 69.9 |
| 430° F.-Yield, wt. % | 69.9 | 69.9 |
| LPG | 15.0 | 14.8 |
| $C_3$'s | 5.4 | 5.4 |
| $C_4$'s | 9.6 | 9.4 |
| $C_4$ Olefins/Total $C_4$'s | 0.5 | 0.6 |
| Propylene/$C_3$'s | 0.8 | 0.8 |
| Coke/Cat to Oil | 0.7 | 1.6 |
| Gasoline (C5-430° F., TBP) Properties | | |
| RONC by G-CON* | 93 | 93 |
| MONC by G-CON | 82 | 81 |
| Gasoline Composition by G-CON | | |
| Paraffin, lv % | 3 | 3 |
| Isoparaffin, lv % | 32 | 31 |
| Aromatic, lv % | 35 | 34 |
| Naphthene, lv % | 10 | 10 |
| Olefin, lv % | 20 | 21 |

*G-Con is a gasoline compositional analysis model that estimates the octane number of the gasoline.
** The following data were on a water-free basis.

The ACE automated process was not able to measure water in product. The water content of the Py Oil was measured to be 22.4 wt. %. Therefore, the contribution to free water in the feed was (22.4 wt. %*20 wt. %=4.5%). Water of reaction was estimated to be 2%, based on 20% feed content. Liquid product yields for Py Oil were normalized by a 0.92 factor. Gas yields were also corrected for CO and $CO_2$ via a 0.94 factor for Py Oil. CO, $CO_2$ and ratio for all runs were assumed to be constant. Conversions were not adjusted.

TABLE XI

Detailed Product Yield Data at Constant Coke
ACE Yield Comparisons at Constant Coke

| Feed (wt. %) | 100% VGO | 80% VGO 20% Py Oil |
|---|---|---|
| Rxn Temp (° F.) | 995 | 995 |
| 430° F.+ Conv., wt. % | 72.8 | 71.7 |
| C/O, wt/wt | 7.7 | 5.1 |
| Yields, wt. % | | |
| Coke | 4.7 | 4.7 |
| Hydrogen | 0.2 | 0.1 |
| CO | 0.0 | 0.6 |
| $CO_2$ | 0.0 | 0.6 |
| Dry Gas (C1 + C2) | 2.4 | 2.4 |
| Methane | 1.1 | 1.0 |
| Ethane | 0.7 | 0.7 |
| Ethylene | 0.7 | 0.7 |
| Propane | 1.3 | 1.2 |
| Propylene | 4.7 | 4.3 |
| n-Butane | 1.1 | 1.0 |
| Isobutane | 4.2 | 3.6 |
| $C_4$ Olefins | 5.1 | 4.6 |
| 1-butene | 1.2 | 1.1 |
| Isobutylene | 1.1 | 1.0 |
| c-2-butene | 1.2 | 1.1 |
| t-2-butene | 1.5 | 1.4 |
| Butadiene | 0.1 | 0.1 |
| Gasoline (C5-430° F.) | 49.5 | 45.1 |
| LCO (430° F.-650° F.) | 17.2 | 16.1 |
| Slurry (650° F.+) | 9.4 | 9.2 |
| Water ** | 0.0 | 6.5 |
| Miscellaneous Yields and Selectivities: | 73.4 | 72.4 |
| 430° F.-Yield, wt. % | 73.4 | 72.4 |
| LPG | 16.5 | 15.7 |
| $C_3$'s | 6.0 | 5.9 |
| $C_4$'s | 10.5 | 9.8 |
| $C_4$ Olefins/Total $C_4$'s | 0.5 | 0.5 |
| Propylene/$C_3$'s | 0.8 | 0.8 |
| Coke/Cat to Oil | 0.6 | 0.9 |
| Gasoline (C5-430° F., TBP) Properties | | |
| RONC by G-CON | 94 | 94 |
| MONC by G-CON | 83 | 82 |
| Gasoline Composition by G-CON | | |
| Paraffin, lv % | 3 | 3 |
| Isoparaffin, lv % | 34 | 33 |
| Aromatic, lv % | 37 | 36 |
| Naphthene, lv % | 9 | 9 |
| Olefin, lv % | 17 | 19 |

** The following data were on a water-free basis.

The ACE automated process was not able to measure water in product. The water content of the Py Oil was measured to be 22.4 wt. %. Therefore, the contribution to free water in the feed was (22.4 wt. %*20 wt. %=4.5%). Water of reaction was estimated to be 2%, based on 20% feed content. Liquid product yields for Py Oil were normalized by a 0.92 factor. Gas yields were also corrected for CO and $CO_2$ via a 0.94 factor for Py Oil. CO, $CO_2$ and ratio for all runs were assumed to be constant. Conversions were not adjusted.

TABLE XII

Detailed Product Yield Data at Constant Cat/Oil Ratio
ACE Yield Comparisons at Constant Cat/Oil Ratio

| Feed (wt. %) | 100% VGO | 80% VGO 20% Py Oil |
|---|---|---|
| Rxn Temp (° F.) | 995 | 995 |
| 430° F.+ Conv., wt. % | 72.8 | 73.2 |
| C/O, wt/wt | 7.7 | 7.7 |
| Yields, wt. % | | |
| Coke | 4.7 | 5.4 |
| Hydrogen | 0.2 | 0.1 |
| CO | 0.0 | 0.6 |
| $CO_2$ | 0.0 | 0.6 |
| Dry Gas (C1 + C2) | 2.4 | 2.5 |
| Methane | 1.1 | 1.1 |
| Ethane | 0.7 | 0.7 |
| Ethylene | 0.7 | 0.8 |
| Propane | 1.3 | 1.3 |
| Propylene | 4.7 | 4.5 |
| n-Butane | 1.1 | 1.0 |
| Isobutane | 4.2 | 4.0 |
| $C_4$ Olefins | 5.1 | 4.7 |
| 1-butene | 1.2 | 1.1 |
| Isobutylene | 1.1 | 1.0 |
| c-2-butene | 1.2 | 1.1 |
| t-2-butene | 1.5 | 1.4 |
| Butadiene | 0.1 | 0.1 |
| Gasoline (C5-430° F.) | 49.5 | 44.7 |
| LCO (430° F.-650° F.) | 17.2 | 15.4 |
| Slurry (650° F.+) | 9.4 | 8.5 |
| Water | 0.0 | 6.5 |
| ** | | |
| Miscellaneous Yields and Selectivities: | 73.4 | 73.9 |
| 430° F.-Yield, wt. % | 73.4 | 73.9 |
| LPG | 16.5 | 16.6 |
| $C_3$'s | 6.0 | 6.2 |
| $C_4$'s | 10.5 | 10.4 |
| $C_4$ Olefins/Total $C_4$'s | 0.5 | 0.5 |
| Propylene/$C_3$'s | 0.8 | 0.8 |
| Coke/Cat to Oil | 0.6 | 0.7 |
| Gasoline (C5-430° F., TBP) Properties | | |
| RONC by G-CON | 94 | 94 |
| MONC by G-CON | 83 | 83 |
| Gasoline Composition by G-CON | | |
| Paraffin, lv % | 3 | 3 |
| Isoparaffin, lv % | 34 | 33 |
| Aromatic, lv % | 37 | 37 |
| Naphthene, lv % | 9 | 9 |
| Olefin, lv % | 17 | 18 |

** The following data were on a water-free basis.

TABLE XIII

Raw ACE Lab Reactor Data from Cracking Runs
ECAT with VGO Feed

| | Normalized ACE Yields (C/O wt/wt 6.0, Conv. wt. % 71.3) | Nomialized ACE Yields (C/O wt/wt 4.8, Conv. wt. % 68.7) | Normalized ACE Yields (C/O wt/wt 7.5, Conv. wt. % 72.6) | Normalized ACE Yields (C/O wt/wt 9.0, Conv. wt. % 73.8) |
|---|---|---|---|---|
| Coke | 4.1 | 3.4 | 4.7 | 5.2 |
| Gasoline | 49.5 | 48.8 | 49.3 | 49.7 |
| LCO | 17.9 | 19.2 | 17.2 | 16.7 |
| HCO | 10.2 | 11.3 | 9.5 | 8.8 |
| $H_2$ | 0.3 | 0.3 | 0.2 | 0.2 |
| C1 | 1.0 | 1.0 | 1.1 | 1.1 |
| C2 | 0.7 | 0.6 | 0.7 | 0.7 |
| C2= | 0.7 | 0.6 | 0.7 | 0.8 |
| C3 | 1.2 | 1.1 | 1.3 | 1.4 |
| C3= | 4.5 | 4.2 | 4.7 | 4.8 |
| IC4 | 3.9 | 3.5 | 4.2 | 4.4 |
| NC4 | 1.0 | 0.9 | 1.1 | 1.2 |
| C4= | 5.1 | 5.1 | 5.2 | 5.1 |
| Material Balance wt. % | 96.6 | 97.5 | 97.2 | 98.4 |
| Dry Gas wt. % | 2.34 | 2.22 | 2.46 | 2.51 |
| Gasoline RON | 93 | 93 | 94 | 94 |
| Gasoline MON | 82 | 82 | 82 | 83 |

TABLE XIV

Raw ACE Lab Reactor Data from Cracking Runs
ECAT with 80 wt. % VGO and 20 wt. % Py Oil

|  | Normalized ACE Yields (C/O wt/wt 6.0, Conv. wt. % 72.2) | Normalized ACE Yields (C/O wt/wt 4.8, Conv. wt. % 70.0) | Normalized ACE Yields (C/O wt/wt 7.5, Conv. wt. % 73.3) | Normalized ACE Yields (C/O wt/wt 9.0, Conv. wt. % 74.1) |
|---|---|---|---|---|
| Coke | 5.9 | 4.0 | 5.2 | 5.6 |
| Gasoline | 48.6 | 49.0 | 48.9 | 49.2 |
| LCO | 17.4 | 18.4 | 16.8 | 16.4 |
| HCO | 9.8 | 10.9 | 9.3 | 8.8 |
| $H_2$ | 0.1 | 0.1 | 0.1 | 0.1 |
| C1 | 1.1 | 1.1 | 1.1 | 1.2 |
| C2 | 0.7 | 0.7 | 0.7 | 0.7 |
| C2= | 0.8 | 0.7 | 0.8 | 0.9 |
| C3 | 1.3 | 1.2 | 1.4 | 1.4 |
| C3= | 4.6 | 4.4 | 4.9 | 4.9 |
| IC4 | 3.8 | 3.5 | 4.3 | 4.5 |
| NC4 | 1.0 | 0.9 | 1.1 | 1.2 |
| C4= | 4.9 | 5.1 | 5.2 | 5.1 |
| Material Balance wt. % | 97.0 | 96.3 | 96.5 | 98.5 |
| Dry Gas wt. % | 2.63 | 2.49 | 2.68 | 2.71 |
| Gasoline RON | No Data | No Data | No Data | No Data |
| Gasoline MON | No Data | No Data | No Data | No Data |

In Tables XIII and XIV, the ACE unit conditions included a reactor temperature of 995° F. and a feed tube clearance of 1.125 inches. The gasoline was a C5 to 430° F. TBP cut, and the LCO was a 430° F. to 650° F. TBP cut. The HCO was a 650° F.+TBP. The test run yields were normalized to $H_2S$ free.

Example 8

Introduction

The ACE unit, as a versatile tool both for FCC catalysts and feedstock screening, was used for this example. The ACE unit used was not configured to feed two streams simultaneously. To provide a suitable feed stream for the ACE unit, emulsion was used to disperse pyrolysis oil into gas oil as feed by using an emulsifier.

Experimental

Preparation of Emulsion

Proven as an efficient emulsifier, ATLOX® 4912 was used to prepare the pyrolysis oil-in-gas oil emulsion with 10 wt. % of py oil. The gas oil sample was an FCC feed. 1 wt. % of surfactant was used, as the weight ratio of gas oil to pyrolysis liquid was fixed at 9:1. The gas oil was mixed with the surfactant first, followed by addition of pyrolysis oil. The mixture was sonicated at 45° C. for an hour before use.

Catalytic Cracking Condition

Figure 3:
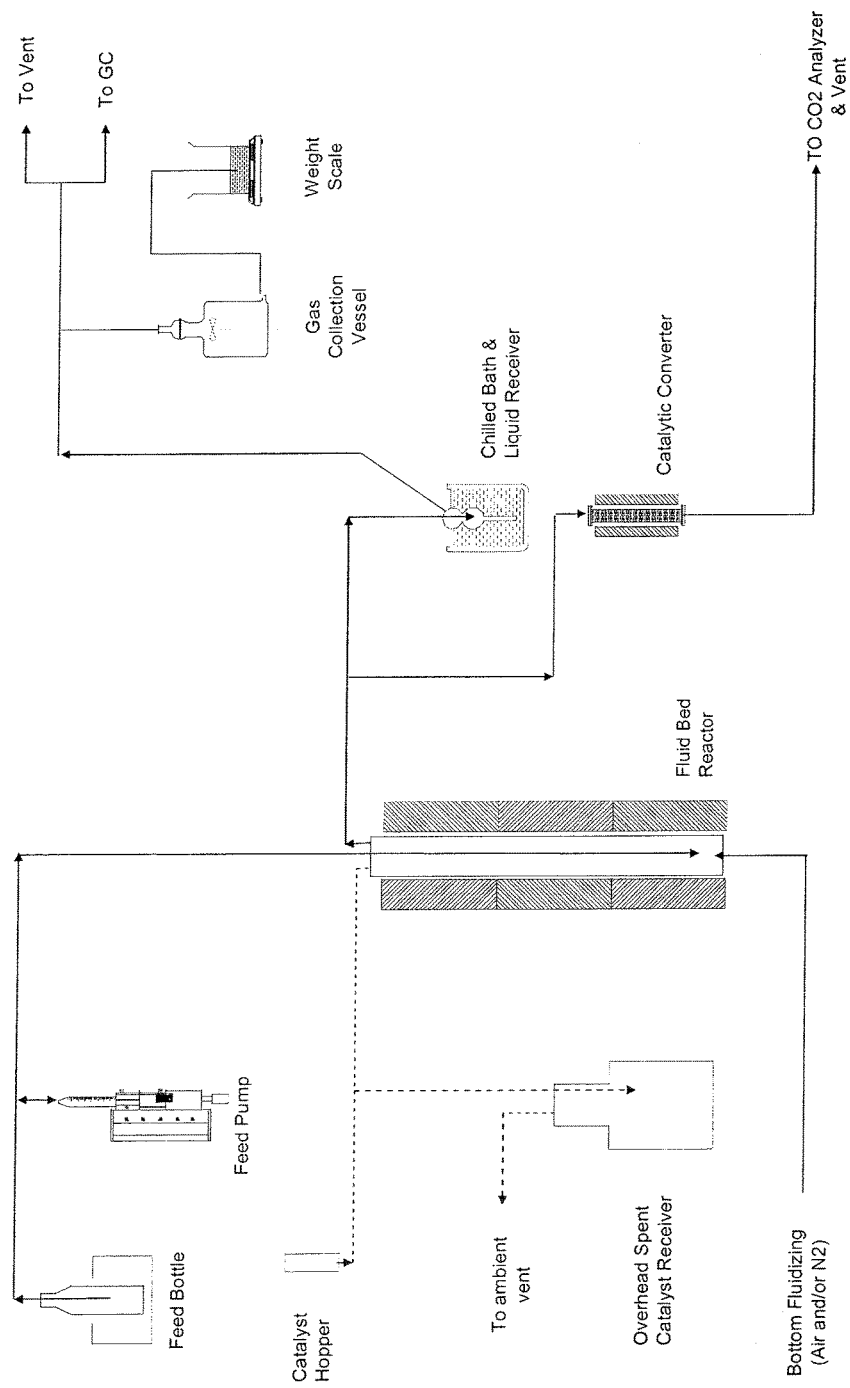
FIG. 3 illustrates an embodiment of the ACE unit process flow diagram for Example 8.

For comparison, the gas oil and the emulsion were fed to the ACE unit respectively, both at four different catalyst/oil ratios. Typical conditions used in standard FCC catalyst analyses were applied and summarized in Table XV. The process flow diagram is shown in FIG. 3. The feed line temperature was kept at 175° F. to avoid potential coking or deposition in the feed lines.

Results and Discussion

Feedstock Properties

Figure 4:
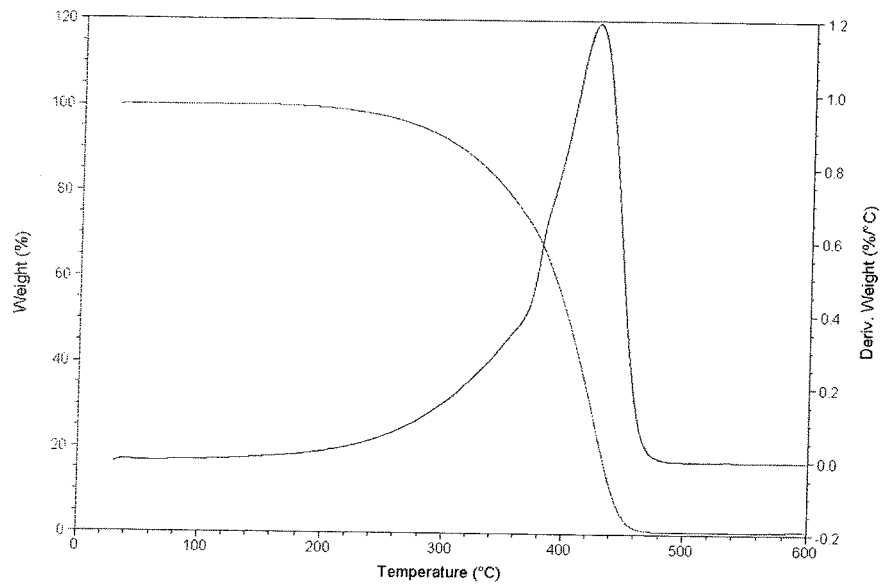
FIG. 4 illustrates TGA characteristics of the gas oil feed for Example 8.
Figure 5:
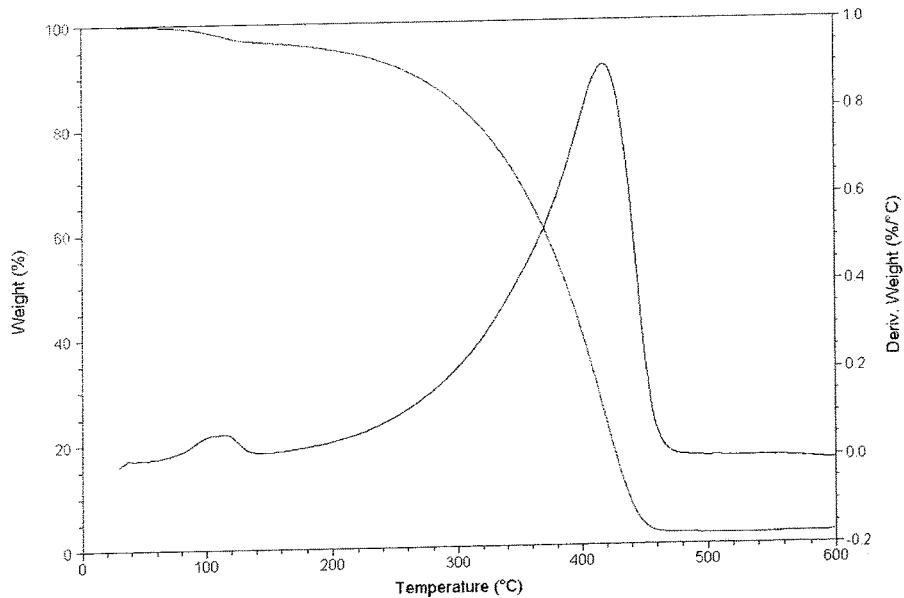
FIG. 5 illustrates TGA characteristics of 10% py oil-in-gas oil emulsion for Example 8.

Pyrolysis oil is well known for its typically poor thermal stability. With excessive coking at high temperature, the feed injection system may be plugged very easily, especially when the feedline is only 1/16" OD. Therefore, TGA analysis was conducted prior to feeding of the pyrolysis oil into the reactor to avoid possible plugging in the feed lines. Both gas oil and the emulsion were tested on the TGA, as shown in FIGS. 4 and 5. The major weight loss for both feeds happened in the 300-460° C. region.

For emulsion, the weight loss was 4.8% by 200° C., compared to 0.4% of the gas oil. The weight loss of emulsion in the low temperature region was mostly attributed to water and volatiles. The VGO began losing weight around 150° C. The peak of the derivative curve was at about 425° C. The emulsion showed two weight loss regions. The first region had a peak at about 115° C., and the weight loss up to 140° C. was about 3.3%. The second weight loss region began shortly after 140° C. with a peak around 420° C. and was complete by about 470° C. At this mass loss rate, it was not expected to observe significant thermal events, especially when the feed system was kept at a low temperature of only 175° F.

The remaining weights after 500° C. were 0.7 and 2.1 wt % for gas oil and emulsion, respectively. This agrees with the pyrolysis oil having higher value of Carbon Residue of around 18.2%.

CHNS analyses, water content, and TAN of the emulsifier, pyrolysis oil, VGO, and the emulsion are shown in Table XVI.

Conversion

Tables XVII-XIX summarize the ACE test results on the basis of constant catalyst-to-oil ratio, constant coke, and constant conversion. The full data set are shown in Tables XIX and XX. The pyrolysis oil appeared to be very reactive under ACE cracking conditions and easy to crack. At the same catalyst/oil ratio, the conversion of the 10% emulsion was 1.34% higher than the gas oil (72.93%). Therefore, to reach the same level of 430° F.+ conversion, the py-oil-in-gas oil emulsion used a lower catalyst/oil ratio. For example, at 75% conversion, the py oil blend used a catalyst/oil ratio of 5.76 against 7.11 for gas oil. Or, to reach the same level of coke yield of 4.5%, the 10% pyrolysis oil emulsion had a lower 430° F.+ conversion.

Under catalytic cracking conditions, pyrolysis oil cracked to form various components. At constant catalyst/oil ratio, yields of coke, dry gas ($C_1$ and $C_2$), $C_3$'s and $C_4$'s increased in a statistically significant manner. The cracking to coke and gas were obtained at the expense of liquid yields. The yields of gasoline, LCO and HCO declined. The hydrogen yields decreased as well.

From a visual inspection of the liquid products, it was not obvious that water was formed during the cracking of the pyrolysis oil blend. At the time of the test, the instrument was not equipped to analyze the CO or $CO_2$ of the product gas, if any.

Product Distribution

Table XVII shows the yields of both feedstocks under identical catalytic cracking conditions. This provides a good comparison for the cracking performance of pyrolysis oil against gas oil. For coke and dry gas, the difference in selectivity was significantly higher for pyrolysis oil. The selectivity was higher for pyrolysis oil in converting into $C_3$'s and $C_4$'s, and lower into gasoline and LCO. For hydrogen and HCO, the negative values indicated pyrolysis oil was not likely selectively converted toward hydrogen and HCO. In turn, the hydrogen and HCO converted from gas oil were consumed in the catalytic reaction of pyrolysis oil. The VGO may serve as a hydrogen donor when it was blended with pyrolysis oil or pyrolytic lignin for the FCC reaction.

When only as much as 1.2-2.4 grams of samples were used in ACE test, along with the fact that pyrolysis oil was only 10% in the emulsion, experimental error may also have resulted in the negative selectivity in borderline situations.

Figure 6:
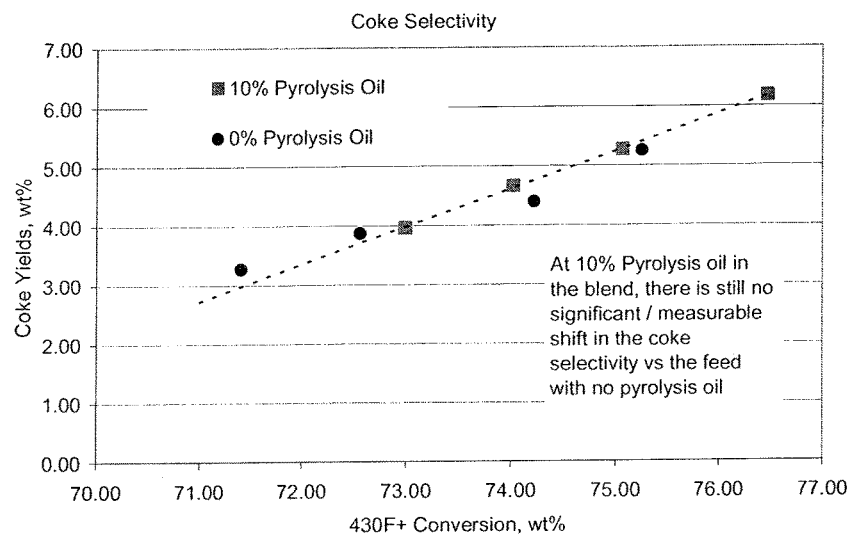
FIG. 6 illustrates coke selectivity vs. cracking conversion for gas oil and 10% py oil-in-gas oil for Example 8.
Figure 7:
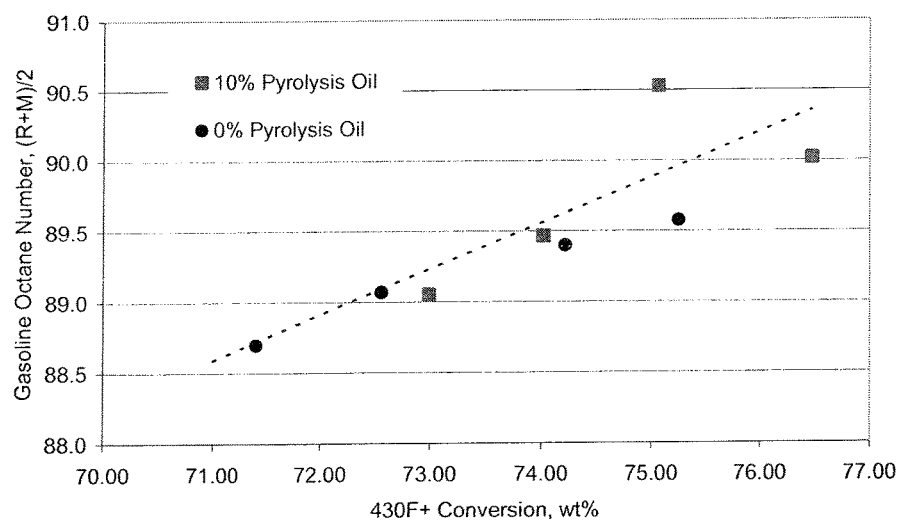
FIG. 7 illustrates gasoline octane number vs. cracking conversion for gas oil and 10% py oil-in-gas oil for Example 8.

By comparing coke formation at the same conversion level, as in FIG. 6, the selectivity of coke did not shift significantly for the two feedstocks, which applied similarly for the gasoline octane number as shown in FIG. 7 even though the GCON detected an improvement in the octane performance of the gasoline obtained from the pyrolysis blend. The GCON analysis was calibrated based on a conventional FCC gasoline, which may not be completely representative of the pyrolysis oil product.

Oxygenates in Product

Figure 8:
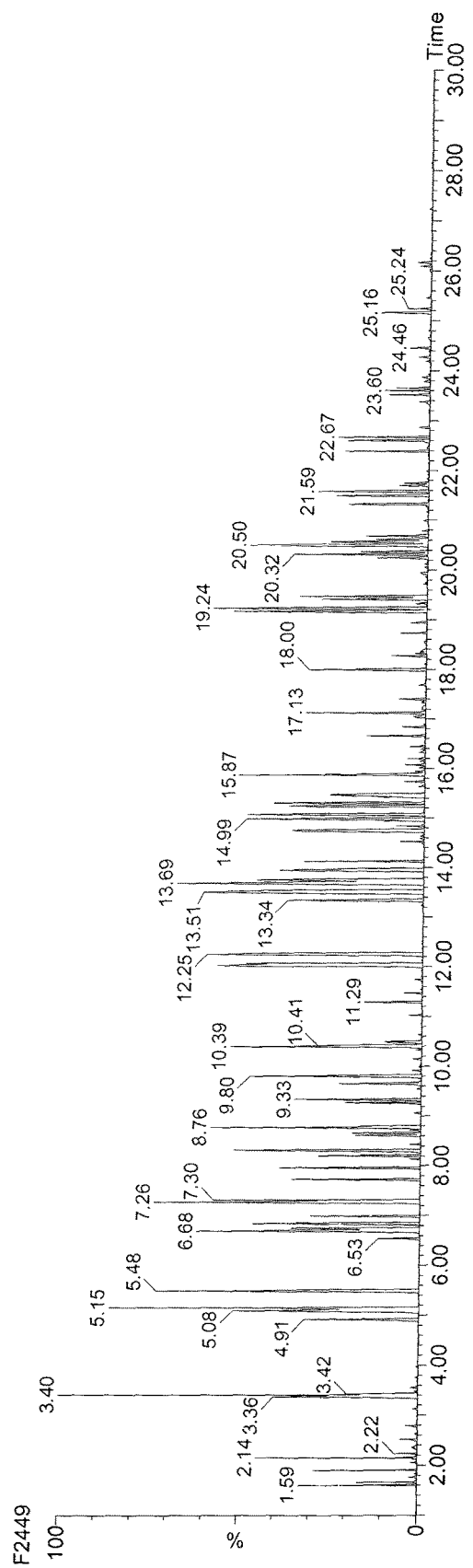
FIG. 8 illustrates GC/MS chromatograph of the liquid product of gas oil for Example 8.
Figure 9:
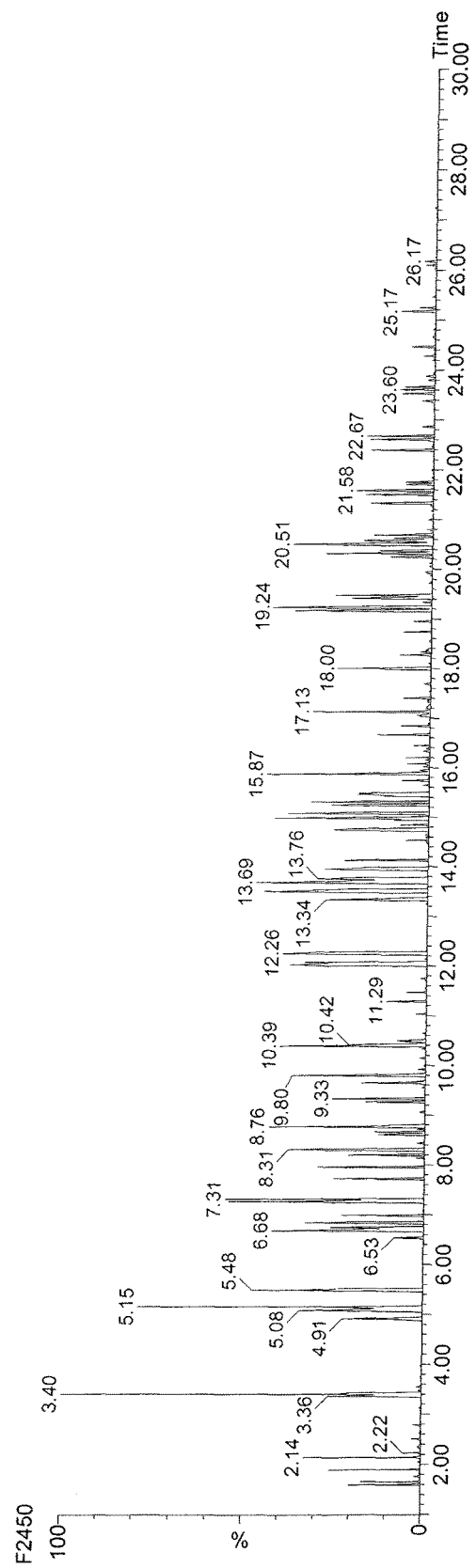
FIG. 9 illustrates GC/MS chromatograph of 10% pyrolysis oil and 90% gas oil for Example 8.

To identify the potential oxygenate species in the liquid product from the 10% pyrolysis oil-in-gas oil emulsion, GC-MS was used on the liquid products, as shown in FIGS. 8 and 9. By comparison of the two chromatograms, no traceable amount of oxygenates were identified within the detection limit of the instrument.

Using model oxygenated compounds, reactions on HZSM-5 catalyst at temperatures up to 450° C. were studied, 80° C. below the temperature of this example. Alcohols, phenols, aldehydes, ketones, and acids were all tested. Based on these results, even though these oxygenates may differ in their reactivities, the product distribution showed similarities as the reaction included cracking, dehydration, decarboxylation, and decarbonylation. After the conversion, oxygenates were limited to low concentration in the product, if not totally converted.

Oxygenates in the product at FCC conditions would be even lower, since there were two mayor differences. The temperature in the ACF test was higher, which promoted the deoxygenation reactions. The catalyst used in the ACE test was primarily Y zeolite catalyst with a minor amount of ZSM-5 additives. All the acid catalyzed reactions were carried out on the FCC catalyst. Formation of aromatics from oxygenates were affected by smaller amount of ZSM-5 catalyst present.

CONCLUSIONS 10 wt % pyrolysis oil-in-gas oil emulsion was successfully catalytically cracked on an ACE (Advanced Catalyst Evaluation) unit. At FCC conditions, pyrolysis oil was more reactive than gas oil. The yields of coke and $C_1$-$C_4$ gas were higher, and those of liquid product (gasoline, LCO, HCO) were lower than the respective yields from gas oil. The reaction results indicated that gas oil may serve as a hydrogen donor in the FCC processing of pyrolysis oil, which means that hydrogen may not needed. Low oxygen content was found in the liquid product.

TABLE XV

ACE reaction conditions

| Catalyst | Ferndale Refinery ECAT 200511008 |
|---|---|
| Catalyst weight | 9 grams |
| Feed Injection Rate | 1.2 g/min |
| Catalyst/oil ratio | 3.75, 5, 6, and 7.5 |
| Fluid-bed reaction temperature | 985° F. |
| Feed bottle heater | 175° F. |
| Feed-line heater | 175° F. |
| Syringe heater | 175° F. |

TABLE XVI

Feed Properties for the ACE Test

| | Methods | Pyrolysis Oil | ATLOX ® 4912 | VGO | Emulsion |
|---|---|---|---|---|---|
| $H_2O$, % | D4928 | 25 | 0.0492 | 0.0065 | 1.91 |
| TAN, mg KOH/g | Modified D664 | 71.4 | 7.61 | 0.38 | |
| Elemental analysis, % | C | 40.46 | 70.04 | 86.93 | 83.87 |
| | H | 7.58 | 10.66 | 11.58 | 11.31 |
| | N | — | — | 0.19 | — |
| | S | — | — | 0.49 | 0.53 |
| | O* | 51.96 | 19.3 | 0.81 | 4.29 |

*by difference, wet base

TABLE XVII

Yields of Gas Oil and 10% py oil-in-gas oil emulsion from ACE test at constant cat/oil ratio

| | Constant Cat-to-Oil Ratio | | |
|---|---|---|---|
| Feedstock | 100% gas oil | 10% Py oil + 90% gas oil | Yield differences |
| 430° F.+ Conversion, wt. % | 72.93 | 74.27 | 1.34 |
| YIELDS, wt. %: | | | |
| Coke | 3.90 | 4.69 | 0.79 |
| Hydrogen | 0.19 | 0.16 | −0.03 |
| Dry Gas ($C_1$ + $C_2$) | 1.99 | 2.34 | 0.35 |
| $C_3$'s | 7.00 | 7.32 | 0.32 |
| $C_4$'s | 11.54 | 11.93 | 0.38 |
| Gasoline | 48.96 | 48.27 | −0.69 |
| LCO | 18.62 | 18.36 | −0.25 |
| HCO (670° F.+) | 7.80 | 6.93 | −0.87 |
| Gasoline Composition | | | |
| Paraffin, lv % | 3.0 | 3.1 | 0.1 |
| Isoparaffin, lv % | 28.6 | 31.7 | 3.1 |
| Aromatic, lv % | 35.0 | 29.7 | −5.3 |
| Naphthene, lv % | 9.2 | 7.8 | −1.3 |
| Olefin, lv % | 24.2 | 27.5 | 3.3 |
| Benzene, lv % | 0.9 | 0.7 | −0.1 |

*: by subtracting the contribution from VGO

TABLE XVIII

Yields of Gas Oil and 10% py oil-in-Gas Oil emulsion from ACE test at constant coke yield

| Feedstock | 100% Gas Oil | 10% Py oil + 90% Gas Oil | Yields Differences |
|---|---|---|---|
| 430° F.+ Conversion, wt. % | 74.14 | 73.92 | −0.22 |
| Yields, wt. %: | | | |
| Coke | 4.50 | 4.50 | 0.00 |
| Hydrogen | 0.19 | 0.16 | −0.03 |
| Dry Gas ($C_1 + C_2$) | 2.10 | 2.31 | 0.21 |
| $C_3$'s | 7.16 | 7.26 | 0.10 |
| $C_4$'s | 11.81 | 11.84 | 0.04 |
| Gasoline | 49.02 | 48.30 | −0.72 |
| LCO | 17.79 | 18.59 | 0.80 |
| HCO (670° F.+) | 7.44 | 7.05 | −0.40 |

TABLE XIX

Yields of Gas Oil and 10% py oil-in-Gas Oil emulsion from ACE test at constant conversion

| Feedstock | 100% Gas Oil | 10% Py oil + 90% Gas Oil | Yields Differences |
|---|---|---|---|
| 430° F.+ Conversion, wt. % | 75.00 | 75.00 | 0 |
| catalyst/oil ratio | 7.11 | 5.76 | |
| YIELDS, wt. %: | | | |
| Coke | 5.02 | 5.14 | 0.12 |
| Hydrogen | 0.18 | 0.16 | −0.02 |
| Dry Gas ($C_1 + C_2$) | 2.18 | 2.41 | 0.23 |
| $C_3$'s | 7.28 | 7.46 | 0.18 |
| $C_4$'s | 12.05 | 12.14 | 0.09 |
| Gasoline | 48.90 | 48.12 | −0.78 |
| LCO | 17.20 | 17.88 | 0.68 |
| HCO (670° F.+) | 7.19 | 6.69 | −0.50 |
| Total | 100.00 | 100.00 | |

TABLE XX

ACE yield comparisons of two feedstocks
ACE Yield Comparisons of two Feedstocks
Pyrolysis Gasoil Evaluation

| Mode | Constant Cat-to-Oil Ratio | | Constant Conversion | | Constant Coke Yields | |
|---|---|---|---|---|---|---|
| Feedstock | 100% Gas Oil | 10% Pyrolysis | 100% Gas Oil | 10% Pyrolysis | 100% Gas Oil | 10% Pyrolysis |
| 430° F.+ Conversion, wt. % | 72.93 | 74.27 | 75.00 | 75.00 | 74.14 | 73.92 |
| FBCU Catalyst/Oil, wt/wt | 5.00 | 5.00 | 7.11 | 5.76 | 6.13 | 4.68 |
| YIELDS, wt. %: | | | | | | |
| Coke | 3.90 | 4.69 | 5.02 | 5.14 | 4.50 | 4.50 |
| Hydrogen | 0.19 | 0.16 | 0.18 | 0.16 | 0.19 | 0.16 |
| Dry Gas ($C_1 + C_2$) | 1.99 | 2.34 | 2.18 | 2.41 | 2.10 | 2.31 |
| Methane | 0.76 | 0.86 | 0.84 | 0.89 | 0.81 | 0.85 |
| Ethane | 0.51 | 0.60 | 0.53 | 0.61 | 0.52 | 0.60 |
| Ethylene | 0.72 | 0.88 | 0.81 | 0.91 | 0.77 | 0.86 |
| Propane | 1.35 | 1.42 | 1.50 | 1.49 | 1.44 | 1.39 |
| Propylene | 5.65 | 5.90 | 5.78 | 5.97 | 5.72 | 5.87 |
| n-Butane | 1.06 | 1.10 | 1.16 | 1.15 | 1.12 | 1.08 |
| Isobutane | 4.65 | 4.82 | 5.12 | 5.03 | 4.92 | 4.72 |
| $C_4$ Olefins | 5.83 | 6.01 | 5.76 | 5.96 | 5.77 | 6.04 |
| 1-butene | 1.28 | 1.30 | 1.26 | 1.29 | 1.27 | 1.31 |
| Isobutylene | 1.42 | 1.42 | 1.36 | 1.39 | 1.37 | 1.45 |
| c-2-butene | 1.33 | 1.39 | 1.34 | 1.40 | 1.33 | 1.39 |
| t-2-butene | 1.72 | 1.79 | 1.71 | 1.79 | 1.71 | 1.79 |
| Butadiene | 0.09 | 0.10 | 0.09 | 0.10 | 0.09 | 0.10 |
| Gasoline | 48.96 | 48.27 | 48.90 | 48.12 | 49.02 | 48.30 |
| LCO | 18.62 | 18.36 | 17.20 | 17.88 | 17.79 | 18.59 |
| 670° F.+ | 7.80 | 6.93 | 7.19 | 6.69 | 7.44 | 7.05 |
| Total | 100.00 | 100.00 | 100.00 | 100.00 | 100.00 | 100.00 |
| LPG/Gasoline | 0.38 | 0.40 | 0.40 | 0.41 | 0.39 | 0.40 |
| LCO/Slurry | 2.39 | 2.65 | 2.39 | 2.67 | 2.39 | 2.64 |
| Miscellaneous Yields and Selectivities: | 73.59 | 74.71 | | | | |
| 430° F.-Yield, wt. % | 73.59 | 74.71 | 75.61 | 75.43 | 74.77 | 74.37 |
| LPG | 18.54 | 19.25 | 19.32 | 19.60 | 18.96 | 19.10 |
| C3s | 7.00 | 7.32 | 7.28 | 7.46 | 7.16 | 7.26 |
| C4s | 11.54 | 11.93 | 12.05 | 12.14 | 11.81 | 11.84 |
| C4 Olefins/Total C4s | 0.51 | 0.50 | 0.48 | 0.49 | 0.49 | 0.51 |
| Propylene/C3s | 0.81 | 0.81 | 0.79 | 0.80 | 0.80 | 0.81 |
| Coke/Cat to Oil | 0.78 | 0.94 | 0.71 | 0.89 | 0.73 | 0.96 |
| Gasoline (C5-430° F., TBP) Properties | | | | | | |
| RONC by G-CON | 95.40 | 96.13 | 95.81 | 96.22 | 95.64 | 96.08 |
| MONC by G-CON | 82.77 | 83.32 | 83.27 | 83.48 | 83.07 | 83.24 |

TABLE XX-continued

ACE yield comparisons of two feedstocks
ACE Yield Comparisons of two Feedstocks
Pyrolysis Gasoil Evaluation

| Mode | Constant Cat-to-Oil Ratio | | Constant Conversion | | Constant Coke Yields | |
|---|---|---|---|---|---|---|
| Feedstock | 100% Gas Oil | 10% Pyrolysis | 100% Gas Oil | 10% Pyrolysis | 100% Gas Oil | 10% Pyrolysis |
| Gasoline Composition by G-CON | | | | | | |
| Paraffin, lv % | 3.0 | 3.1 | 3.0 | 3.1 | 3.0 | 3.2 |
| Isoparaffin, lv % | 28.6 | 31.7 | 29.3 | 31.1 | 29.0 | 32.0 |
| Aromatic, lv % | 35.0 | 29.7 | 34.9 | 31.7 | 35.0 | 28.8 |
| Naphthene, lv % | 9.2 | 7.8 | 8.7 | 7.8 | 8.9 | 7.9 |
| Olefin, lv % | 24.2 | 27.5 | 24.0 | 26.3 | 24.1 | 28.1 |
| Benzene, lv % | 0.9 | 0.7 | 0.9 | 0.8 | 0.9 | 0.7 |

TABLE XXI

ACE Test Results of Feedstock
100% Gas Oil

| | Normalized ACE Yields (C/O wt/wt 3.75, Conv. wt. 71.40%) | Normalized ACE Yields (C/O wt/wt 5.00, Conv. wt. % 72.56) | Normalized ACE Yields (C/O wt/wt 6.00, Conv. wt. % 74.21) | Normalized ACE Yields (C/O wt/wt 7.50, Conv. wt. % 75.25) |
|---|---|---|---|---|
| Coke | 3.27 | 3.87 | 4.40 | 5.26 |
| Gasoline | 48.53 | 49.07 | 48.65 | 49.05 |
| LCO | 19.64 | 18.85 | 17.84 | 16.95 |
| HCO | 8.26 | 7.93 | 7.32 | 7.20 |
| $H_2$ | 0.21 | 0.18 | 0.19 | 0.18 |
| C1 | 0.71 | 0.74 | 0.81 | 0.85 |
| C2 | 0.50 | 0.50 | 0.54 | 0.53 |
| C2= | 0.66 | 0.71 | 0.78 | 0.81 |
| C3 | 1.25 | 1.32 | 1.47 | 1.50 |
| C3= | 5.60 | 5.51 | 5.88 | 5.72 |
| IC4 | 4.33 | 4.56 | 5.05 | 5.09 |
| NC4 | 0.98 | 1.03 | 1.15 | 1.16 |
| C4= | 6.05 | 5.72 | 5.93 | 5.69 |
| Material Balance wt. % | 99.97 | 99.85 | 100.74 | 98.99 |
| Dry Gas wt. % | 1.87 | 1.95 | 2.13 | 2.19 |
| Gasoline RON | 95.1 | 95.4 | 95.7 | 95.8 |
| Gasoline MON | 82.3 | 82.8 | 83.1 | 83.3 |
| (R + M)/2 | 88.7 | 89.1 | 89.4 | 89.6 |

TABLE XXII

ACE Test Results of Feedstock
10% Pyrolysis Gas Oil + 90% Gas Oil

| | Normalized ACE Yields (C/O wt/wt 3.75, Conv. wt. 72.99%) | Normalized ACE Yields (C/O wt/wt 5.00, Conv. wt. % 74.02) | Normalized ACE Yields (C/O wt/wt 6.00, Conv. wt. % 75.06) | Normalized ACE Yields (C/O wt/wt 7.50, Conv. wt. % 76.47) |
|---|---|---|---|---|
| Coke | 3.96 | 4.66 | 5.28 | 6.18 |
| Gasoline | 48.43 | 48.05 | 47.99 | 47.53 |
| LCO | 19.23 | 18.43 | 17.89 | 16.92 |
| HCO | 7.31 | 7.11 | 6.62 | 6.20 |
| $H_2$ | 0.16 | 0.16 | 0.16 | 0.16 |
| C1 | 0.81 | 0.86 | 0.89 | 0.96 |
| C2 | 0.59 | 0.60 | 0.61 | 0.63 |
| C2= | 0.82 | 0.88 | 0.91 | 0.99 |
| C3 | 1.30 | 1.43 | 1.49 | 1.62 |
| C3= | 5.78 | 5.89 | 5.96 | 6.14 |
| IC4 | 4.42 | 4.84 | 5.06 | 5.45 |
| NC4 | 1.01 | 1.11 | 1.16 | 1.25 |
| C4= | 6.18 | 6.00 | 5.99 | 5.98 |
| Material Balance wt. % | 96.69 | 99.60 | 99.20 | 100.33 |
| Dry Gas wt. % | 2.22 | 2.33 | 2.41 | 2.57 |

TABLE XXII-continued

ACE Test Results of Feedstock
10% Pyrolysis Gas Oil + 90% Gas Oil

|  | Normalized ACE Yields (C/O wt/wt 3.75, Conv. wt. 72.99%) | Normalized ACE Yields (C/O wt/wt 5.00, Conv. wt. % 74.02) | Normalized ACE Yields (C/O wt/wt 6.00, Conv. wt. % 75.06) | Normalized ACE Yields (C/O wt/wt 7.50, Conv. wt. % 76.47) |
|---|---|---|---|---|
| Gasoline RON | 95.5 | 95.8 | 97.1 | 96.3 |
| Gasoline MON | 82.6 | 83.1 | 84.0 | 83.7 |
| (R + M)/2 | 89.0 | 89.5 | 90.5 | 90.0 |

Although the present invention and its advantages have been described in detail, it should be understood that various changes, substitutions and alterations may be made herein without departing from the spirit and scope of the invention as defined by the appended claims.

What is claimed is:

1. A method for producing hydrocarbon products, comprising:
   (A) introducing a biological feed comprising a biomass-derived liquid to a riser;
   (B) introducing a hydrocarbon feed comprising hydrocarbons having a boiling point above 343° C. of 60 volume % to about 100 volume % to the riser; and
   (C) reacting the hydrocarbon feed and the biological feed in the presence of a first catalyst and a second catalyst to convert at least a portion of the biological feed and at least a portion of the hydrocarbons to hydrocarbon products, wherein the hydrocarbon products comprise a concentration of oxygen from about 0.005 wt. % to about 6 wt. %;
   wherein:
   the first catalyst and the second catalyst are compositionally different;
   the first catalyst comprises about 10 wt. % to about 60 wt. % kaolin, about 20 wt. % to about 65 wt. % aluminum oxide, about 2 wt. % to about 30 wt. % silicon dioxide, and about 5 wt. % to about 60 wt. % of a first zeolite said first zeolite having a pore diameter from about 0.2 nanometers to about 0.8 nanometers and 10 to 12 membered rings; and the second catalyst comprises about 10 wt. % to about 40 wt. % aluminum oxide, about 0 wt. % to about 60 wt. % magnesium oxide, about 0.1 wt. % to about 30 wt. % aluminum orthophosphate, about 0.1 wt. % to about 10 wt. % vanadyl sulfate, and a second zeolite said second zeolite having a pore diameter of about 0.2 nanometers to about 0.7 nanometers and 10 or less membered rings.

2. The method of claim 1, further comprising mixing the biological feed and the hydrocarbon feed to provide a riser feed, wherein the riser feed is introduced to the riser.

3. The method of claim 2, wherein the riser feed comprises from about 0.1 wt. % biological feed to about 99.9 wt. % biological feed, and from about 99.9 wt. % hydrocarbon feed to about 0.1 wt. % hydrocarbon feed.

4. The method of claim 2, further comprising mixing an emulsifier with the biological feed and the hydrocarbon feed to provide the riser feed.

5. The method of claim 1, wherein the catalyst comprises from about 1 wt. % to about 30 wt. % second catalyst and from about 99 wt. % to about 70 wt. % first catalyst.

6. The method of claim 1, wherein the biomass-derived liquid comprises pyrolysis oil, and the hydrocarbon feed comprises vacuum gas oil, residual oils, or any a combinations thereof.

7. The method of claim 1, further comprising converting hydrocarbons in the biomass-derived liquid and the hydrocarbon feed to liquid hydrocarbons of $C_3$ or higher at a yield from about 80 wt. % to about 100 wt. %.

8. The method of claim 1, further comprising (D) deactivating the catalyst with steam deactivation.

* * * * *

UNITED STATES PATENT AND TRADEMARK OFFICE
CERTIFICATE OF CORRECTION

| | | |
|---|---|---|
| PATENT NO. | : 9,944,859 B2 | Page 1 of 1 |
| APPLICATION NO. | : 13/866837 | |
| DATED | : April 17, 2018 | |
| INVENTOR(S) | : Kristi A. Fjare et al. | |

It is certified that error appears in the above-identified patent and that said Letters Patent is hereby corrected as shown below:

On the Title Page

Please delete:
"(73) Assignee: Phillips 66 Company Albermarle Corporation, Houston, TX (US)"

And replace with:
- (73) Assignee: Phillips 66 Company Houston, TX (US); Albermarle Corporation, Baton Rouge, (LA)
-

Signed and Sealed this
Second Day of July, 2019

Andrei Iancu
*Director of the United States Patent and Trademark Office*